US008165782B2

(12) United States Patent
Jeong

(10) Patent No.: US 8,165,782 B2
(45) Date of Patent: Apr. 24, 2012

(54) FUEL SAVING APPARATUS

(75) Inventor: Seung Hyun Jeong, Donghae-si (KR)

(73) Assignee: Mosomoto Co., Ltd., Chungcheongnam-do (KR)

( * ) Notice: Subject to any disclaimer, the term of this patent is extended or adjusted under 35 U.S.C. 154(b) by 657 days.

(21) Appl. No.: 12/310,644

(22) PCT Filed: Aug. 31, 2007

(86) PCT No.: PCT/KR2007/004213
§ 371 (c)(1),
(2), (4) Date: Feb. 26, 2009

(87) PCT Pub. No.: WO2008/026900
PCT Pub. Date: Mar. 6, 2008

(65) Prior Publication Data
US 2010/0250098 A1     Sep. 30, 2010

(30) Foreign Application Priority Data

| Sep. 1, 2006 | (KR) | 10-2006-0084223 |
| Jan. 24, 2007 | (KR) | 10-2007-0007552 |
| Jan. 24, 2007 | (KR) | 10-2007-0007553 |
| Jan. 24, 2007 | (KR) | 10-2007-0007554 |
| Feb. 27, 2007 | (KR) | 10-2007-0019837 |
| Apr. 11, 2007 | (KR) | 10-2007-0035718 |
| Jul. 16, 2007 | (KR) | 10-2007-0071299 |

(51) Int. Cl.
*G06F 19/00* (2011.01)
*G06F 11/30* (2006.01)
*F02M 51/00* (2006.01)
*F02D 41/34* (2006.01)

(52) U.S. Cl. ........ 701/104; 701/105; 701/110; 701/115; 701/123; 123/480; 702/182

(58) Field of Classification Search ......... 123/478, 123/480, 486; 701/101–105, 110, 115, 123, 701/207, 213; 702/182, 183, 187, 188; 73/114.52, 73/114.53
See application file for complete search history.

(56) References Cited

U.S. PATENT DOCUMENTS

| 4,718,015 A | * | 1/1988 | Grob et al. ......... 701/103 |
| 5,661,651 A | | 8/1997 | Geschke et al. |
| 6,725,149 B2 | * | 4/2004 | Wada et al. ......... 701/115 |
| 7,096,848 B2 | * | 8/2006 | Ono et al. ......... 123/294 |
| 7,487,036 B2 | * | 2/2009 | Kim ............ 701/123 |

FOREIGN PATENT DOCUMENTS

| JP | 2002-225593 | 8/2002 |
| KR | 0035541 | 3/1999 |
| KR | 2004-0063088 A | 7/2004 |
| KR | 2006-0112776 A | 11/2006 |

OTHER PUBLICATIONS

International Search Report, PCT/KR2007/004213, Nov. 28, 2007.
International Preliminary Report of Patentability, PCT/KR2007/004213, Nov. 7, 2008.

* cited by examiner

*Primary Examiner* — Willis Wolfe, Jr.
(74) *Attorney, Agent, or Firm* — Abelman, Frayne & Schwab

(57) ABSTRACT

The present invention provides a fuel saving apparatus that provides information, such as vehicle speed, a fuel injection period, fuel efficiency and engine load, to a driver in real time, thereby enabling the driver to develop economic driving and economical driving habits.

39 Claims, 10 Drawing Sheets

FUEL SAVING APPARATUS

TECHNICAL FIELD

The present invention relates to a fuel saving apparatus.

More particularly, the present invention relates to a fuel saving apparatus that provides information, such as vehicle speed, a fuel injection period, fuel efficiency and engine load, to a driver in real time, thereby enabling the driver to develop economic driving and economical driving habits.

BACKGROUND ART

Since the 1980s, the development of electronic technology has brought about various changes in automobile manufacturing technology. Since the development of microcomputers has affected automobiles, the current air pollution level can be achieved, and thus combustion suitable for the discharge of exhaust gas satisfying desired criteria can be achieved, thereby making a great contribution to fuel economy.

It has been observed that there is no method of achieving a greater fuel saving effect and reducing exhaust gas using the current structures and materials of engines. The only method of reducing fuel consumption and suppressing exhaust gas further is for a driver to practice economical driving.

In general, the fuel consumption of a vehicle is lowest in an appropriate load range, and is high in low and high load ranges. Therefore, when appropriate load driving is performed, economical driving can be realized. However, conventional vehicles are not equipped with display devices indicating the amounts of fuel consumed or the extents of loads, so that drivers cannot be aware of load ranges in which their vehicles are being operated, with the result that they cannot drive the vehicles in appropriate load ranges.

From various experiments, it was proved that a difference equal to or greater than 20% occurred between the amount of fuel consumed at a speed of 100 km/H and the amount of fuel consumed at a speed of 130 km/H, and a difference equal to or greater than 30% occurred between the amount of fuel consumed for slow acceleration and the amount of fuel consumed for fast acceleration.

However, although drivers are aware that fuel consumption varies with the driving method, they cannot observe the variation, so that they cannot experience fuel consumption depending on the driving method, and thus do not practice economical driving.

In general, the amount of fuel consumed is measured in such a way that a measuring instrument for measuring the amount of fuel consumed is installed in a fuel supply line and the amount of fuel consumed is measured using it. However, the measuring instrument for measuring the amount of fuel consumed costs millions of won or tens of millions of won, which is a high price, and thus it is used for the purpose of developing engines in automobile manufacturers or automobile-related research laboratories, but it is impossible for drivers to know the amount of fuel consumed by their vehicles. Furthermore, in order to obtain the amount of fuel consumed and fuel efficiency, many drivers having interest in fuel efficiency estimate fuel efficiency using the amount of fuel consumed and the traveled distance based on the amount of fuel that is charged when a fuel tank is completely filled with fuel again after a trip odometer is set to 0 at the time of first completely filling the fuel tank with fuel and traveling over a certain distance is subsequently performed.

However, this method does not provide accurate measured values, cannot be utilized in real time, provides only average results, and is not utilized for the provision of real-time information.

DISCLOSURE

Technical Problem

Accordingly, the present invention has been made keeping in mind the above problems occurring in the prior art, and an object of the present invention is to provide a fuel saving apparatus that can calculate the amount of fuel consumed and fuel efficiency, attributable to traveling, in the most efficient way and display them in real time.

Another object of the present invention is to provide a fuel saving apparatus that provides a fuel injection period and the like, which allows the amount of fuel consumed to be known to a driver, to the driver in real time, thereby enabling the driver to develop economical driving and economical driving habits.

A further object of the present invention is to provide a fuel saving apparatus that provides fuel efficiency and section traveled distance to a driver in real time, thereby enabling the driver to develop economical driving habits.

Yet another object of the present invention is to provide a fuel saving apparatus that can calculate engine load attributable to traveling in the most efficient way and display it in real time.

Still another object of the present invention is to provide a fuel saving apparatus that provides an MP3 function, a GPS function, a navigation function, a DMB function, and a vehicle PC function, thereby enabling a driver to receive various services using a single terminal.

Technical Solution

In order to accomplish the above objects, the present invention provides a fuel saving apparatus, including an effective injection period calculation module for receiving an injection valve opening signal, and calculating an effective injection period; an injection amount calculation unit for calculating an amount of injection using the effective injection period received from the effective injection period calculation module; a fuel efficiency calculation module for receiving the amount of injection from the injection amount calculation unit and vehicle speed from a speedometer, and calculating fuel efficiency; a display unit for displaying the effective injection period, calculated by the effective injection period calculation module, and the fuel efficiency, calculated by the fuel efficiency calculation module, to a driver; and a control unit for controlling the effective injection period calculation module, the injection amount calculation unit, the fuel efficiency calculation module, and the display unit.

Additionally, the present invention provides a fuel saving apparatus, including an effective injection period calculation module for receiving an injection valve opening signal, and calculating an effective injection period; an injection amount calculation unit for calculating an amount of injection using the effective injection period received from the effective injection period calculation module; a fuel efficiency calculation module for receiving the amount of injection from the injection amount calculation unit, receiving vehicle speed from a GPS speedometer provided with a GPS receiver for receiving a signal from a satellite, and calculating fuel efficiency; a display unit for displaying the effective injection period, calculated by the effective injection period calculation module, and the fuel efficiency, calculated by the fuel efficiency calculation module, to a driver; and a control unit for controlling the effective injection period calculation module, the injection amount calculation unit, the fuel efficiency calculation module, and the display unit.

Additionally, the present invention provides a fuel saving apparatus, including a GPS module for receiving a GPS signal, acquiring GPS information from the received GPS signal, and outputting the GPS information; an effective injection period calculation module for receiving an injection valve opening signal, and calculating an effective injection period; an injection amount calculation unit for calculating an amount of injection using the effective injection period received from the effective injection period calculation module; a speedometer for calculating vehicle speed using the GPS information received from the GPS module; a fuel efficiency calculation module for receiving the amount of injection from the injection amount calculation unit and the vehicle speed from the speedometer, and calculating fuel efficiency; a display unit for displaying the effective injection period, calculated by the effective injection period calculation module, and the GPS information, output from the GPS module, to a driver; and a control unit for controlling the GPS module, the effective injection period calculation module, the injection amount calculation unit, the fuel efficiency calculation module, the speedometer and the display unit.

Advantageous Effects

According to the present invention, engine load, attributable to traveling, is calculated in the most efficient way and is displayed in real time so that a driver can view it, thereby providing an advantage of enabling the driver to develop economical driving habits.

Furthermore, according to the present invention, the amount of fuel consumed and fuel efficiency attributable to traveling, in addition to engine load attributable to traveling, is calculated in the most efficient way and is displayed in real time so that a driver can view them, thereby providing an advantage of enabling the driver to develop economical driving habits.

Moreover, according to the present invention, fuel efficiency and section traveled distance attributable to traveling, in addition to engine load attributable to traveling, are provided to a driver in real time, thereby providing an advantage of enabling the driver to develop economical driving habits.

Furthermore, according to the present invention, a GPS service function or a DMB service function is provided, so that a user can receive various services using a single terminal, thereby providing the advantage of providing convenience to the user.

BEST MODE

Now, with reference to FIG. 1 and the drawings following it, fuel saving apparatuses according to preferred embodiments of the present invention will be described in detail.

Figure 1:
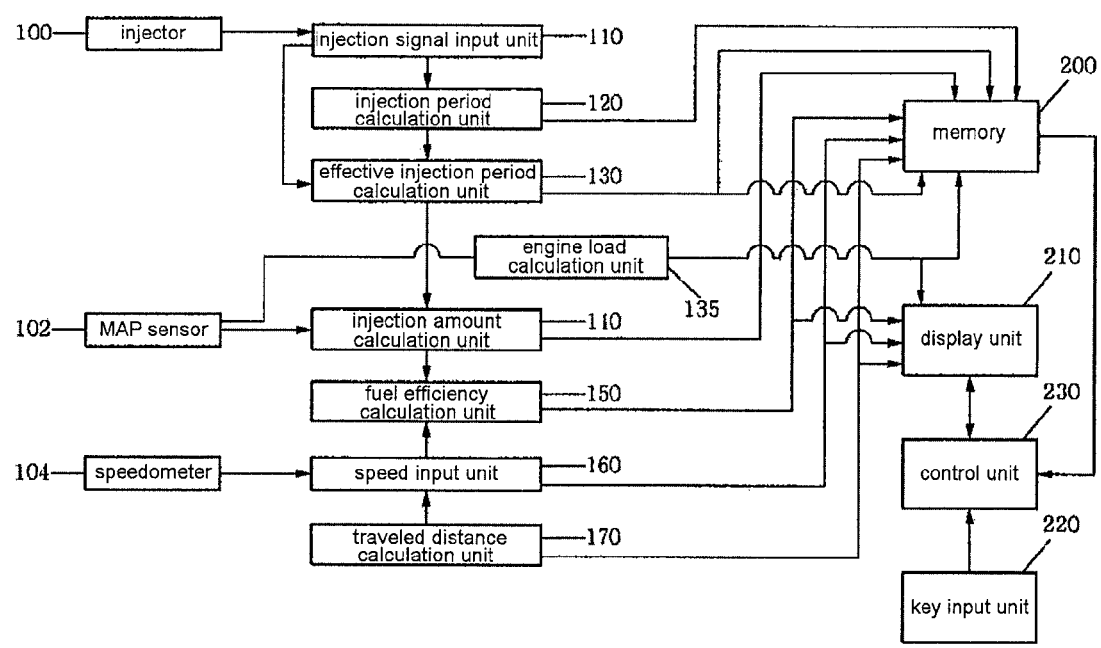
FIG. 1 is a block diagram of a fuel saving apparatus according to an embodiment of the present invention.

FIG. 1 is a block diagram of a fuel saving apparatus according to an embodiment of the present invention.

Referring to this drawing, the fuel saving apparatus according to the embodiment of the present invention includes an injector 100, a Manifold Absolute Pressure (MAP) sensor 102, a speedometer 104, an injection signal input unit 110, an injection time calculation unit 120, an effective injection time calculation unit 130, an engine load calculation unit 135, an injection amount calculation unit 140, a fuel efficiency calculation unit 150, a speed input unit 160, a traveled distance calculation unit 170, memory 200, a display unit 210, a key input unit 220, and a control unit 230. Here, the injection signal input unit 110, the injection time calculation unit 120, and the effective injection time calculation unit 130 may be referred to as an effective injection time calculation module, and the fuel efficiency calculation unit 150 and the speed input unit 160 may be referred to as a fuel efficiency calculation unit.

Here, the injector 100 receives an injection valve opening signal from an Electronic Control Unit (ECU), opens the injection valve, and sends the injection valve opening signal, received from the ECU, to the injection signal input unit 110.

The injection signal input unit 110 receives the injection valve opening signal from the injector 100 via a wired connection, and sends the received injection valve opening signal to the injection time calculation unit 120.

The injection time calculation unit 120 calculates an injection period from the injection valve opening signal received from the injection signal input unit 110.

In this case, the waveform of the injection valve opening signal, received by the injection signal input unit 110 from the injector 100, is, for example, a stepped waveform. In this stepped waveform, a section having a voltage of 0 V is an injection section.

Accordingly, the injection time calculation unit 120 measures the period of an injection section from the injection valve opening signal, having a stepped waveform, so as to calculate an injection period, and calculates the injection period.

Meanwhile, the effective injection time calculation unit 130 obtains an effective injection period from the injection period calculated by the injection time calculation unit 120. The reason for obtaining the effective injection period is that it takes time for the injection valve to be opened to the extent that fuel can be actually drawn when the injector 100 receives the injection valve opening signal from the ECU and opens the injection valve.

Furthermore, although the injector 100 receives an injection valve opening signal from the ECU and opens the injection valve, the amount of fuel drawn for an opening period may vary with the width of the opening of the injection valve, therefore the effective injection period is required from the point of view of calculation of the average.

Accordingly, the effective injection time calculation unit 130 obtains the effective injection period in consideration of the actual operation of the injection valve, which is expressed by the following Equation 1.

$$Teff=T-(Tnull-(bv-11)*K1) \quad (1)$$

where T is the injection period, Teff is the effective injection period, Tnull is an ineffective injection period, and by is battery voltage.

Here, the effective injection period Teff refers to a period for which a desired or larger amount of fuel can be injected when the injection valve is opened.

The injection period T refers to an injection period calculated by the injection time calculation unit 120. The injection period T is a period that is calculated by the injector 100 from the injection valve opening signal received from the ECU.

The ineffective injection period Tnull refers to a period for which the injection valve is opened but a desired amount of fuel is not injected, when the battery voltage by is set to 11 V.

Since the ineffective injection period Tnull is calculated with the battery voltage by set to 11 V, correction is required in response to a change in battery voltage, therefore the factor (bv−11)*K1 is subtracted.

In this case, the correction factor (bv−11)*K1 is obtained by subtracting 11 V from battery voltage by and multiplying the resulting value by a weight constant K1. As the battery voltage becomes higher, the correction value becomes larger. In contrast, when the battery voltage becomes lower, the correction value becomes smaller. As a result, as the battery voltage becomes higher, the ineffective injection period Tnull, to be subtracted from the injection period T, becomes shorter, therefore the effective injection period becomes longer. Furthermore, as the battery voltage becomes lower, the ineffective injection period Tnull, to be subtracted from the injection period T, becomes longer, therefore the effective injection period becomes shorter.

Meanwhile, the effective injection time calculation unit 130 can calculate the effective injection period from the injection period, received from the injection time calculation unit 120, using Equation 1.

That is, the effective injection time calculation unit 130 receives the injection period calculated by the injection time calculation unit 120, receives the injection valve opening signal from the injection signal input unit 110, measures rated voltage, calculates the ineffective injection period, and then can calculate the effective injection period using Equation 1.

The effective injection time calculation unit 130 sends information about the effective injection period, calculated as described above, to the injection amount calculation unit 140, and stores it in the memory 200.

Meanwhile, the engine load calculation unit 135 receives a signal based on vacuum pump pressure from the MAP sensor 102, and calculates engine load.

Figure 2:
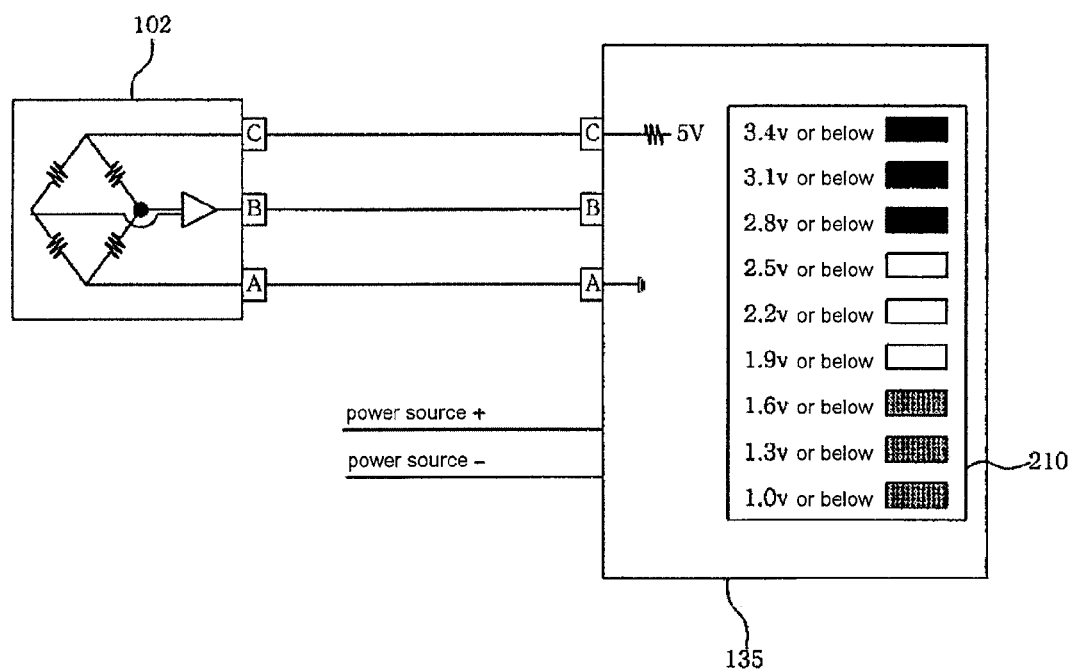
FIG. 2 is a conceptual diagram showing the relationship between the output signals of the MAP sensor of FIG. 1 and the indicated engine loads of the display unit.

This will be described below with reference to FIG. 2, which is a conceptual diagram showing the relationship between the output signal of the MAP sensor of FIG. 1 and the amount of engine load displayed on the display unit.

That is, the MAP sensor 102 outputs voltage based on the pressure of the vacuum pump using a scanner. At this time, as shown in FIG. 2, since the reference voltage of the MAP sensor 102 is set to 5V, a maximum voltage of 5 V is output. The relationship between vacuum pump pressure and output signals is shown in the following Table 1 as an example.

TABLE 1

| Vacuum pump pressure | Output signal |
|---|---|
| 102 kPa | 4.859~5.000 V |
| 94 kPa | 4.438~4.600 V |
| 40 kPa | 1.521~1.683 V |
| 15 kPa | 0.122~0.382 V |

In this case, a voltage equal to or lower than 1.9 V may be considered to indicate a low load state, a voltage ranging from 1.9 V to 2.5 V may be considered to indicate appropriate load, and a voltage equal to or higher than 2.5 V may be considered to indicate excessive load.

Accordingly, the engine load calculation unit 135 outputs a signal to the display unit 210. The engine load calculation unit 135 outputs a signal that is represented by a scale that increases in increments of 0.3 V from 1.0 V.

Here, a histogram graph to be displayed on the display unit 210 includes a green section, a blue section, and a red section. The green section includes, for example, three bars. If one bar is set such that it indicates an interval of 0.3 V, the green section indicates cases where the output signal falls within the range of 1.0 to 1.9 V. The blue section includes, for example, three bars. If one bar is set such that it indicates 0.3 V, the blue section indicates cases where the output signal falls within the range of 1.9 to 2.5 V. The red section includes, for example, three bars. If one bar is set such that it indicates 0.3 V, the red section indicates cases where the output signal falls within the range of 2.8 to 3.4 V.

In this case, when the number of activated graduations of the bent histogram graph increases, a driver is visually made aware of an increase in load, therefore the driver does not step on an accelerator pedal, so that an indication is located within the blue section when the indication enters the red section, thereby reducing fuel consumption.

Thereafter, the injection amount calculation unit 140 obtains the unit amount of injection by multiplying the effective injection period, calculated by the effective injection time calculation unit 130, by injection pressure, which is expressed by the following Equation 2.

$$Q=K2*Teff*P \quad (2)$$

where Q is the amount of injection, K2 is a variable factor, Teff is an effective injection period, and P is injection pressure.

The reason that the variable factor K2 is required is that the unification of units is required because the units of the effective injection period and the injection pressure are different from the unit of the amount of injection, therefore multiplication by a specific value is necessary.

For the injection pressure P, although a specific value for the type of vehicle may be set as a constant, the MAP sensor 102 receives the injection pressure P in real time, and uses it.

When the amount of injection is calculated as described above, the injection amount calculation unit 140 stores information about the calculated amount of injection in the memory 200.

Thereafter, the speed input unit 160 receives information about speed from the speedometer 104, sends it to the traveled distance calculation unit 170 and the fuel efficiency calculation unit 150, and stores it in the memory 200.

The traveled distance calculation unit 170 calculates a traveled distance using the information about speed from the speed input unit 160, and stores it in the memory 200. That is, the traveled distance calculation unit 170 calculates the traveled distance by multiplying the speed, received from the speed input unit 160, by time, and stores it in the memory 200.

Then, the fuel efficiency calculation unit 150 calculates the fuel efficiency using the amount of injection from the injection amount calculation unit 140 and the speed from the speed input unit 160 based on the following Equation 3.

$$DFC = V(\text{km/h})/F(\text{l/h}) \tag{3}$$

where DFC is the traveling fuel efficiency of a vehicle, V is the traveling speed, and F is the amount of injection.

That is, the fuel efficiency calculation unit 150 obtains the traveling fuel efficiency of a vehicle by dividing the traveling speed by the amount of injection.

Meanwhile, the control unit 230 controls the injection signal input unit 110, the injection time calculation unit 120, the effective injection time calculation unit 130, the engine load calculation unit 135, the injection amount calculation unit 140, the fuel efficiency calculation unit 150, the speed input unit 160, and the traveled distance calculation unit 170.

The control unit 230 controls the display unit 210 so that it displays engine load and speed, displays an effective injection period using a histogram, and displays fuel efficiency. Furthermore, the control unit 230 controls the display unit 210 so that it further displays accumulated traveling fuel efficiency, sectional traveling fuel efficiency, section distance, the amount of fuel consumed, the injection period, and the engine oil replacement distance.

Figure 3:
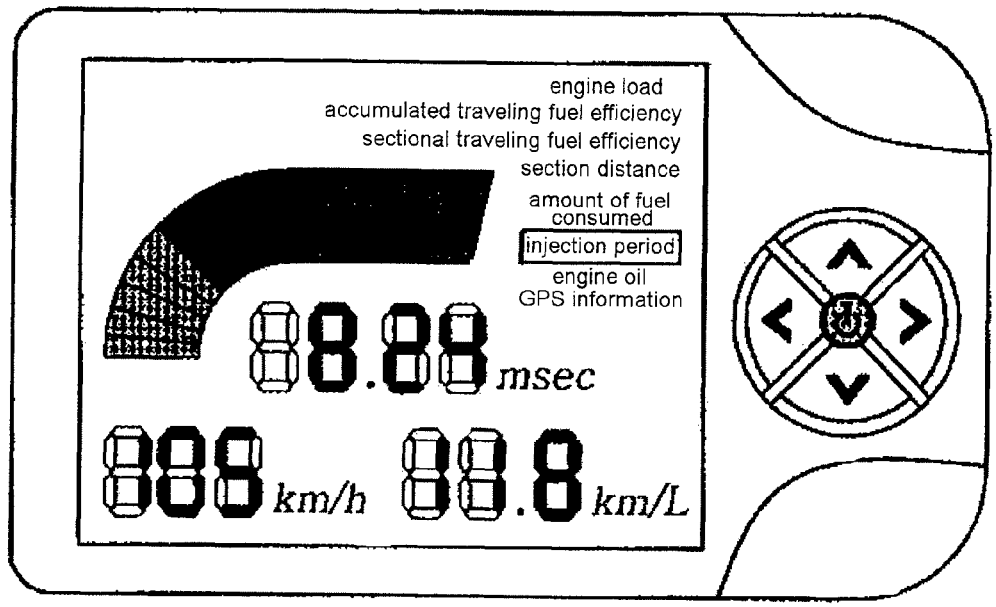
FIG. 3 is a view showing an embodiment in which indicated values are displayed on the display unit of FIG. 1.

An example of speed, an effective injection period histogram, an effective injection period, and effective fuel efficiency, displayed on the display unit 210, is shown in FIG. 3. The speed is displayed on the lower left portion of the display unit 210 in numerals, the fuel efficiency is displayed on the lower right portion thereof in numerals, the effective injection period is displayed on the upper right portion thereof in numerals, and the effective injection period is displayed on the upper portion thereof using a bent histogram graph. The bent histogram graph includes a green section, a blue section, and a red section. The green section includes, for example, five bars. If one bar is set such that it indicates 0.5 ms, the green section indicates cases where the effective injection period falls within the range of 0 to 2.5. The blue section includes, for example, five bars. If one bar is set such that it indicates 0.5 ms, the blue section indicates cases where the effective injection period falls within the range of 2.5 to 5. The red section includes, for example, six bars. If one bar is set such that it indicates 0.5 ms, the red section indicates cases where the effective injection period falls within the range of 5 to 8 ms. Of course, in the case where the effective injection period is equal to or longer than 8 ms, there is no increase in the number of bars of the histogram.

In this case, when the number of activated graduations of the bent histogram graph increases, a driver is made visually aware of the extension of the effective injection period, therefore the driver does not step on an accelerator pedal, so that an indication can be located within the blue section when the indication enters the red section, thereby reducing fuel consumption.

Meanwhile, the control unit 230 provides the display unit 210 with engine load, accumulated traveling fuel efficiency, sectional traveling fuel efficiency, section distance, the amount of fuel consumed, an injection period, engine oil replacement distance, and GPS information.

This engine load has been described above. The accumulated traveling fuel efficiency refers to traveling fuel efficiency accumulated for a period from a specific time point set by a driver to the current time point, and the sectional traveling fuel efficiency refers to the sectional traveling fuel efficiency for a specific section set by the driver.

The section distance refers to the traveled distance of a specific section set by the driver for a corresponding device, and the amount of fuel consumed refers to the amount of fuel consumed at a specific time point.

The effective injection period refers to the period for which fuel is drawn, and the engine oil replacement distance refers to the distance traveled in a period from the time point at which engine oil was replaced to the current time point. The GPS information is geographical information.

That is, when the driver indicates a desire to know engine load through the manipulation of the key input unit 220, the control unit 230 reads the engine load stored in the memory 200, and provides information about the engine load to the driver using the graduations of a histogram via the display unit 210.

When the driver indicates a desire to know accumulated traveling fuel efficiency through the manipulation of the key input unit 220, the control unit 230 reads real-time traveling fuel efficiency stored in the memory 200, calculates accumulated fuel efficiency, and provides information about the accumulated fuel efficiency to the driver via the display unit 210.

Furthermore, when the driver indicates a desire to know the section-accumulated fuel efficiency for a specific section through the manipulation of the key input unit 220, the control unit 230 calculates section-accumulated fuel efficiency for a section designated by the user, and provides information about the section-accumulated fuel efficiency to the driver via the display unit 210.

Furthermore, when the driver indicates a desire to know the section distance of a specific section through the manipulation of the key input unit 220, the control unit 230 reads a traveled distance stored in the memory 200, calculates the section distance of the specific section, and displays information about the calculated section distance on the display unit 210.

Furthermore, when the driver indicates a desire to know the amount of fuel consumed in a specific section through the manipulation of the key input unit 220, the control unit 230 reads the amount of fuel consumed in a specific section stored in the memory 200, and displays information about the amount of fuel consumed on the display unit 210.

Furthermore, when the driver indicates a desire to know traveled distance, accumulated from the time point at which engine oil was replaced, through the manipulation of the key input unit 220 so as to know the time point for the replacement of engine oil, the control unit 230 reads the traveled distance, accumulated from the time point at which engine oil was replaced to the current time point, from the memory 200, and displays it to the driver. The driver may replace engine oil using the information.

As described above, the control unit 230 reads information about the engine load, the accumulated traveling fuel efficiency, the sectional traveling fuel efficiency, the section distance, the amount of fuel consumed, the injection period, and the engine oil replacement distance from the memory 200 in response to the key manipulation of the key input unit 220 by the driver, and provides this to the driver.

That is, the central key of the key input unit 220 is an ON/OFF key. When the driver turns on the ON/OFF key, the control unit 230 provides available menu options to the display unit 210.

The available menu options, which are provided by the control unit 230 to the display unit 210, include engine load, accumulated traveling fuel efficiency, sectional traveling fuel efficiency, section distance, the amount of fuel consumed, the injection period, engine oil replacement distance, and GPS information.

When the menu options are provided via the display unit 210 as described above, the driver can select a desired menu option using the up/down key of the key input unit 220, and the control unit 230 reads information related to the selected menu option from the memory 200 and displays it on the display unit 210.

In particular, when the driver requests GPS information through the key manipulation of the key input unit 220, the control unit 230 reads the GPS information from a GPS terminal (not shown) and provides it.

Meanwhile, although data is described as being sent between the injector 100 and the injection signal input unit 110, between the MAP sensor 102, the engine load calculation unit 135 and the injection amount calculation unit 150, and between the speedometer 104 and the speed input unit 160 via a wired connection, the transmission method is not limited to this, and data may alternatively be sent via a power line.

Figure 4:
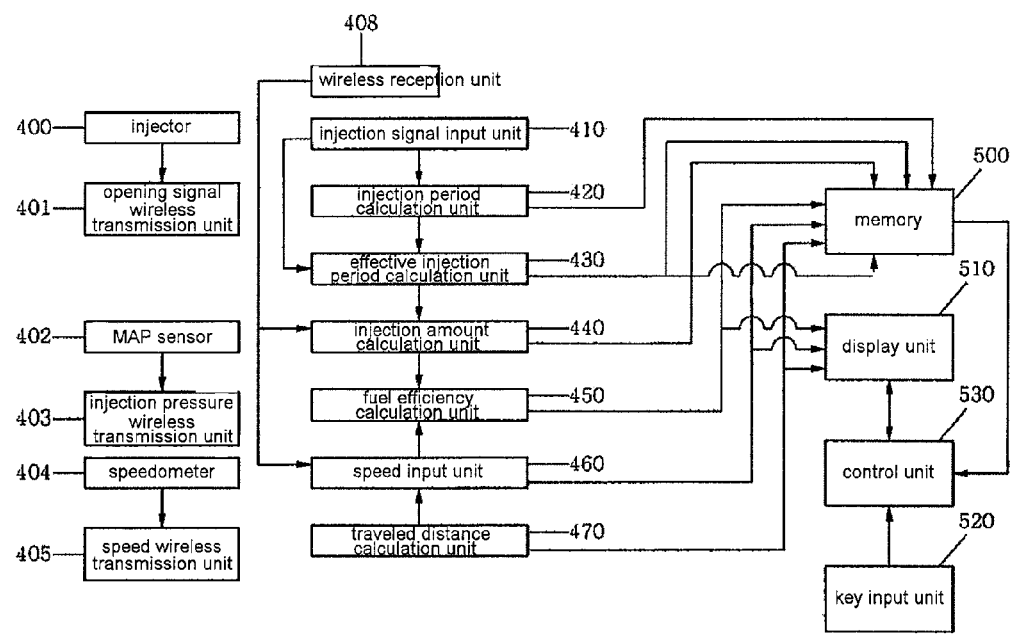
FIG. 4 is a block diagram of a fuel saving apparatus according to a second embodiment of the present invention.

FIG. 4 is a block diagram of a fuel saving apparatus according to a second embodiment of the present invention.

Referring to this drawing, the fuel saving apparatus according to the second embodiment of the present invention includes an injector 400, an opening signal wireless transmission unit 401, a MAP sensor 402, an injection pressure wireless transmission unit 403, a speedometer 404, a speed wireless transmission unit 405, a wireless reception unit 408, an injection signal input unit 410, an injection time calculation unit 420, an effective injection time calculation unit 430, an injection amount calculation unit 440, a fuel efficiency calculation unit 450, a speed input unit 460, a traveled distance calculation unit 470, memory 500, a display unit 510, a key input unit 520, and a control unit 530. Here, the injection signal input unit 410, the injection time calculation unit 420 and the effective injection time calculation unit 430 may be collectively referred to as an effective injection period calculation module, and the fuel efficiency calculation unit 450, the speed input unit 460 and the traveled distance calculation unit 470 may be collectively referred to as a fuel efficiency calculation module.

The injector 400 receives an injection valve opening signal from an ECU, opens an injection valve, and sends the injection valve opening signal, received from the ECU, to the injection signal input unit 410 through the opening signal wireless transmission unit 401 and the wireless reception unit 408.

The injection signal input unit 410 receives the injection valve opening signal from the injector 400 via a wireless connection, and sends the received injection valve opening signal to the injection time calculation unit 420.

The injection time calculation unit 420 calculates the injection period from the injection valve opening signal received from the injection signal input unit 410.

In this case, the waveform of the injection valve opening signal, received by the injection signal input unit 410 from the injector 400, is, for example, a stepped waveform. In this stepped waveform, a section having a voltage of 0 V is an injection section.

Accordingly, the injection time calculation unit 420 measures the period of the injection section from the injection valve opening signal, having a stepped waveform, so as to calculate an injection period, and calculates the injection period.

Meanwhile, the effective injection time calculation unit 430 obtains an effective injection period from the injection period calculated by the injection time calculation unit 420. The reason for obtaining the effective injection period is that it takes time for the injection valve to be opened to the extent that fuel can be actually drawn when the injector 400 receives the injection valve opening signal from the ECU and opens the injection valve.

Furthermore, although the injector 400 receives an injection valve opening signal from the ECU and opens the injection valve, the amount of fuel drawn for an opening period may vary with the width of the opening of the injection valve, therefore the effective injection period is required from the point of view of calculation of the average.

Accordingly, the effective injection time calculation unit 430 obtains the effective injection period in consideration of the actual operation of the injection valve using the above-described Equation 1.

The effective injection time calculation unit 430 sends information about the effective injection period, calculated as described above, to the injection amount calculation unit 440, and stores it in the memory 500.

The injection amount calculation unit 440 obtains the unit amount of injection by multiplying the effective injection period, calculated by the effective injection time calculation unit 430, by injection pressure. The unit amount of injection is obtained using the above-described Equation 2.

When the amount of injection is calculated as described above, the injection amount calculation unit 440 stores information about the calculated amount of injection in the memory 500.

Thereafter, the speed input unit 460 receives information about speed from the speedometer 404 through the speed wireless transmission unit 405 and the wireless reception unit 408 via a wireless connection, sends it to the traveled distance calculation unit 470 and the fuel efficiency calculation unit 450, and stores it in the memory 500.

The traveled distance calculation unit 470 calculates traveled distance using the information about speed from the speed input unit 460, and stores it in the memory 500. That is, the traveled distance calculation unit 470 calculates the traveled distance by multiplying the speed, received from the speed input unit 460, by time, and stores this in the memory 500.

Then, the fuel efficiency calculation unit 450 calculates fuel efficiency using the amount of injection from the injection amount calculation unit 440 and the speed from the speed input unit 460 based on the above-described Equation 3.

Meanwhile, the control unit 530 controls the injection signal input unit 410, the injection time calculation unit 420, the effective injection time calculation unit 430, the injection amount calculation unit 440, the fuel efficiency calculation unit 450, the speed input unit 460, and the traveled distance calculation unit 470.

The control unit 530 controls the display unit 510 so that it displays speed, displays an effective injection period using a histogram, and displays fuel efficiency. Furthermore, the control unit 530 controls the display unit 510 so that it displays accumulated traveling fuel efficiency, sectional traveling fuel efficiency, section distance, the amount of fuel consumed, the injection period, and engine oil replacement distance.

An example of speed, an effective injection period histogram, an effective injection period, and effective fuel efficiency, displayed on the display unit 510, is similar to that of FIG. 3. The speed is displayed on the lower left portion of the display unit 510 in numerals, the fuel efficiency is displayed on the lower right portion thereof in numerals, the effective injection period is displayed on the upper right portion thereof in numerals, and the effective injection period is displayed on the upper portion thereof using a bent histogram graph. The bent histogram graph includes a green section, a blue section, and a red section. The green section includes, for example, five bars. If one bar is set such that it indicates 0.5 ms, the green section indicates cases where the effective injection period falls within the range of 0 to 2.5. The blue section includes, for example, five bars. If one bar is set such that it indicates 0.5 ms, the blue section indicates cases where the effective injection period falls within the range of 2.5 to 5. The red section includes, for example, six bars. If one bar is set such that it indicates 0.5 ms, the red section indicates cases where the effective injection period falls within the range of 5 to 8 ms. Of course, in the case where the effective injection period is equal to or longer than 8 ms, there is no increase in the number of activated bars of the histogram.

In this case, when the number of activated bars of the bent histogram graph increases, the driver is made visually aware of the extension of the effective injection period, therefore the driver does not step on an accelerator pedal so that an indication can be located within the blue section when the indication enters the red section, thereby reducing fuel consumption.

Meanwhile, the control unit 530 provides the display unit 510 with accumulated traveling fuel efficiency, sectional traveling fuel efficiency, section distance, the amount of fuel consumed, the injection period, engine oil replacement distance, and GPS information.

That is, when the driver indicates a desire to know accumulated traveling fuel efficiency through the manipulation of the key input unit 520, the control unit 530 reads the real-time traveling fuel efficiency stored in the memory 500, calculates accumulated fuel efficiency, and provides information about the accumulated fuel efficiency to the driver via the display unit 510.

Furthermore, when the driver indicates a desire to know the section-accumulated fuel efficiency for a specific section through the manipulation of the key input unit 520, the control unit 530 calculates section-accumulated fuel efficiency for a section designated by the user, and provides information about the section-accumulated fuel efficiency to the driver via the display unit 510.

Furthermore, when the driver indicates a desire to know the distance of a specific section through the manipulation of the key input unit 520, the control unit 530 reads traveled distance stored in the memory 500, calculates the distance of the specific section, and displays information about the calculated section distance on the display unit 510.

Furthermore, when the driver indicates a desire to know the amount of fuel consumed in a specific section through the manipulation of the key input unit 520, the control unit 530 reads the amount of fuel consumed in the specific section stored in the memory 500, and displays information about the amount of fuel consumed on the display unit 510.

Furthermore, when the driver indicates a desire to know the traveled distance, accumulated from the time point at which engine oil was replaced, through the manipulation of the key input unit 520 so as to know the time point for replacement of the engine oil, the control unit 530 reads the traveled distance, accumulated from the time point at which engine oil was replaced to the current time point, from the memory 500, and displays it to the driver. The driver may replace engine oil based on the information.

As described above, the control unit 530 reads information about the accumulated traveling fuel efficiency, the sectional traveling fuel efficiency, the section distance, the amount of fuel consumed, the injection period, and the engine oil replacement distance from the memory 500 in response to the key manipulation of the key input unit 520 by the driver, and provides this to the driver.

Figure 5:
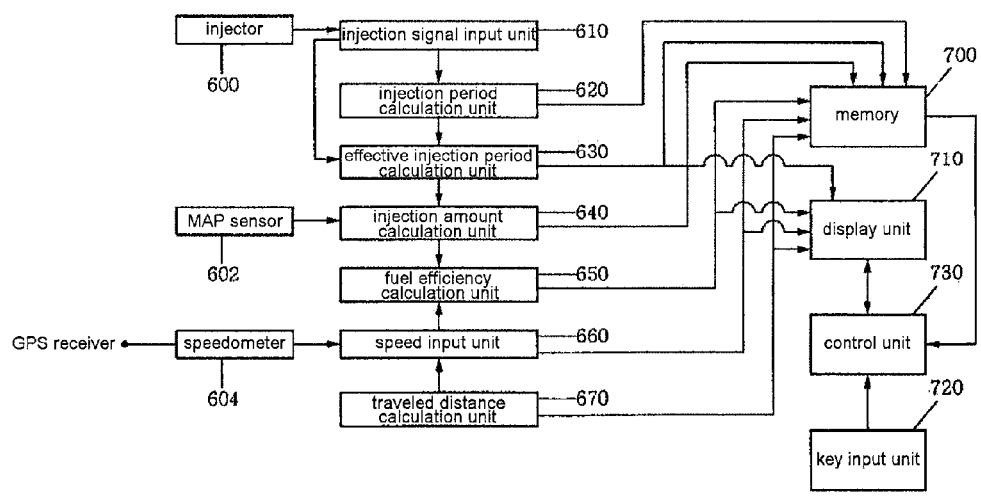
FIG. 5 is a block diagram of a fuel saving apparatus according to a third embodiment of the present invention.

FIG. 5 is a block diagram of a fuel saving apparatus according to a third embodiment of the present invention.

As shown in this drawing, the fuel saving apparatus according to the present embodiment of the present invention includes an injector 600, a MAP sensor 602, a GPS speedometer 604, an injection signal input unit 610, an injection time calculation unit 620, an effective injection time calculation unit 630, an injection amount calculation unit 640, a fuel efficiency calculation unit 650, a speed input unit 660, a traveled distance calculation unit 670, memory 700, a display unit 710, a key input unit 720, and a control unit 730.

Here, the injection signal input unit 610, the injection time calculation unit 620 and the effective injection time calculation unit 630 may be collectively referred to as an effective injection period calculation module, and the fuel efficiency calculation unit 650 and the speed input unit 660 may be collectively referred to as a fuel efficiency calculation module.

The injector 600 is an injection device that injects fuel having normal pressure, which reaches a fuel pipe, into an intake manifold in response to an electrical injection signal. Since the injector 600 is implemented based on well-known technology, a detailed description thereof is omitted here.

That is, the injector 600 receives an injection valve opening signal from an ECU, opens the injection valve, and sends the injection valve opening signal, received from the ECU, to the injection signal input unit 610.

The MAP sensor 602 is used to indirectly measure the amount of air drawn into the engine, and is applied to most recent vehicles. According to the operational principle of the MAP sensor 602, the MAP sensor 602 measures pressure, generated in the intake manifold, through comparison with a predetermined absolute pressure, and indirectly infers the amount of air on the basis of the measurement, thereby causing the injector 600 to be appropriately driven. Since the MAP sensor 602 is implemented based on well-known technology, a detailed description thereof is omitted here.

The GPS speedometer 604 includes a GPS receiver, and measures accurate time and distances from three or more satellites and calculates a current location using trigonometry based on the three different distances. Such a GPS speedometer 604 can obtain accurate time, together with 3-dimensional speed information, as well as latitude, longitude and altitude. Since a technique for detecting the speed of a vehicle using such a GPS receiver is well known, a detailed description thereof is omitted here.

The injection signal input unit 610 receives the injection valve opening signal from the injector 600 via a wired connection, and sends the received injection valve opening signal to the injection time calculation unit 620. The injection time calculation unit 620 calculates the injection period from the injection valve opening signal received from the injection signal input unit 610.

In this case, the waveform of the injection valve opening signal, received by the injection signal input unit 610 from the injector 600, is, for example, a stepped waveform. In this stepped waveform, a section having a voltage of 0 V is an injection section.

Accordingly, the injection time calculation unit 620 measures the period of the injection section from the injection valve opening signal, having a stepped waveform, so as to calculate an injection period, and calculates the injection period.

Meanwhile, the effective injection time calculation unit 630 obtains an effective injection period from the injection period calculated by the injection time calculation unit 620. The reason for obtaining the effective injection period is that it takes time for the injection valve to be opened to the extent that fuel can be actually drawn when the injector 600 receives the injection valve opening signal from the ECU and opens the injection valve.

Furthermore, although the injector 600 receives an injection valve opening signal from the ECU and opens the injection valve, the amount of fuel drawn for an opening period may vary with the width of the opening of the injection valve, therefore the effective injection period is required from the point of view of calculation of the average.

Accordingly, the effective injection time calculation unit 630 obtains the effective injection period in consideration of the actual operation of the injection valve. At this time, the above-described Equation 1 is used.

The effective injection time calculation unit 630 sends information about the effective injection period, calculated as described above, to the injection amount calculation unit 640, and stores this in the memory 700.

The injection amount calculation unit 640 obtains the unit amount of injection by multiplying the effective injection period, calculated by the effective injection time calculation unit 630, by the injection pressure. The unit amount of injection is obtained using the above-described Equation 2.

When the amount of injection is calculated as described above, the injection amount calculation unit 640 stores information about the calculated amount of injection in the memory 700.

Thereafter, the speed input unit 660 receives information about speed from the GPS speedometer 604, sends it to the traveled distance calculation unit 670 and the fuel efficiency calculation unit 650, and stores this in the memory 700.

The traveled distance calculation unit 670 calculates traveled distance using the information about speed from the speed input unit 660, and stores this in the memory 700. That is, the traveled distance calculation unit 670 calculates the traveled distance by multiplying the speed, received from the speed input unit 660, by time, and stores this in the memory 700.

Then, the fuel efficiency calculation unit 650 calculates fuel efficiency using the amount of injection from the injection amount calculation unit 640 and the speed from the speed input unit 660 based on the above-described Equation 3.

Meanwhile, the control unit 730 controls the injection signal input unit 610, the injection time calculation unit 620, the effective injection time calculation unit 630, the injection amount calculation unit 640, the fuel efficiency calculation unit 650, the speed input unit 660, and the traveled distance calculation unit 670.

The control unit 730 controls the display unit 710 so that it displays speed, displays an effective injection period using a histogram, and displays fuel efficiency. Furthermore, the control unit 730 controls the display unit 710 so that it displays accumulated traveling fuel efficiency, sectional traveling fuel efficiency, section distance, the amount of fuel consumed, the injection period, and engine oil replacement distance.

An example of speed, an effective injection period histogram, an effective injection period, and effective fuel efficiency, displayed on the display unit 710, is similar to that of FIG. 3. The speed is displayed on the lower left portion of the display unit 710 in numerals, the fuel efficiency is displayed on the lower right portion thereof in numerals, the effective injection period is displayed on the upper right portion thereof in numerals, and the effective injection period is displayed on the upper portion thereof using a bent histogram graph. The bent histogram graph includes a green section, a blue section, and a red section. The green section includes, for example, five bars. If one bar is set such that it indicates 0.5 ms, the green section indicates cases where the effective injection period falls within the range of 0 to 2.5. The blue section includes, for example, five bars. If one bar is set such that it indicates 0.5 ms, the blue section indicates cases where the effective injection period falls within the range of 2.5 to 5. The red section includes, for example, six bars. If one bar is set such that it indicates 0.5 ms, the red section indicates cases where the effective injection period falls within the range of 5 to 8 ms. Of course, in the case where the effective injection period is equal to or longer than 8 ms, there is no increase in the number of activated bars of the histogram.

In this case, when the number of activated bars of the bent histogram graph increases, the driver is made visually aware of the extension of the effective injection period, therefore the driver does not step on an accelerator pedal, so that an indication can be located within the green section when the indication enters the red section, thereby reducing fuel consumption.

Meanwhile, the control unit 730 provides the display unit 710 with accumulated traveling fuel efficiency, sectional traveling fuel efficiency, section distance, the amount of fuel consumed, the injection period, engine oil replacement distance, and GPS information.

That is, when the driver indicates a desire to know the accumulated traveling fuel efficiency through the manipulation of the key input unit 720, the control unit 730 reads the real-time traveling fuel efficiency stored in the memory 700, calculates the accumulated fuel efficiency, and provides information about the accumulated fuel efficiency to the driver via the display unit 710.

Furthermore, when the driver indicates a desire to know the section-accumulated fuel efficiency for a specific section through the manipulation of the key input unit 720, the control unit 730 calculates section-accumulated fuel efficiency for a section designated by the user, and provides information about the section-accumulated fuel efficiency to the driver via the display unit 710.

Furthermore, when the driver indicates a desire to know the section distance of a specific section through the manipulation of the key input unit 720, the control unit 730 reads traveled distance stored in the memory 700, calculates the section distance of the specific section, and displays information about the calculated section distance on the display unit 710.

Furthermore, when the driver indicates a desire to know the amount of fuel consumed in a specific section through the manipulation of the key input unit 720, the control unit 730 reads the amount of fuel consumed in the specific section stored in the memory 700, and displays information about the amount of fuel consumed on the display unit 710.

Furthermore, when the driver indicates a desire to know traveled distance, accumulated from the time point at which engine oil was replaced, through the manipulation of the key input unit 720 so as to know the time point for the replacement of engine oil, the control unit 730 reads the traveled distance, accumulated from the time point at which engine oil was replaced to the current time point, from the memory 700, and displays it to the driver. The driver may replace engine oil using the information.

As described above, the control unit 730 reads information about the accumulated traveling fuel efficiency, the sectional traveling fuel efficiency, the section distance, the amount of fuel consumed, the injection period, and the engine oil replacement distance from the memory 700 in response to the key manipulation of the key input unit 720 by the driver, and provides this to the driver.

That is, the central key of the key input unit 720 is an ON/OFF key. When the driver turns on the ON/OFF key, the control unit 730 provides available menu options to the display unit 710.

The available menu options, which are provided by the control unit 730 to the display unit 710, include accumulated traveling fuel efficiency, sectional traveling fuel efficiency, section distance, the amount of fuel consumed, the injection period, engine oil replacement distance, and GPS information.

When the menu options are provided via the display unit 710 as described above, the driver can select a desired menu option using the up/down key of the key input unit 720, and the control unit 730 reads information related to the selected menu option from the memory 700 and displays it on the display unit 710.

In particular, when the driver requests GPS information through the key manipulation of the key input unit 720, the control unit 730 reads the GPS information from a GPS terminal (not shown) and provides it.

Meanwhile, an engine load calculation unit for receiving injection pressure from the MAP sensor and calculating engine load using the received injection pressure may be further included, and the display unit may display the engine load, calculated by the engine load calculation unit, to a driver.

Figure 6:
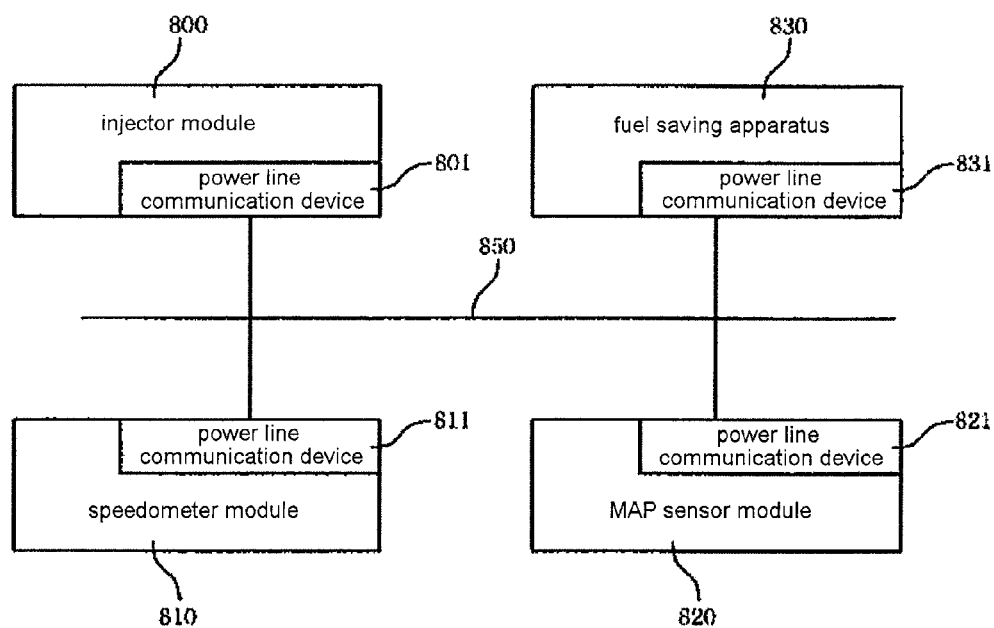
FIG. 6 is a diagram showing a construction for performing the transmission of signals between the injector and the injection signal input unit, between the MAP sensor and the injection amount calculation unit, and between the GPS speedometer and the speed input unit using a power line, as shown in FIG. 5.

FIG. 6 is a diagram showing a construction for performing the transmission of signals between the injector and the injection signal input unit, between the MAP sensor and the injection amount calculation unit, and between the GPS speedometer and the speed input unit using a power line, as shown in FIG. 5.

Referring to this drawing, the construction for performing the transmission of signals between the injector and the injection signal input unit, between the MAP sensor and the injection amount calculation unit, and between the GPS speedometer and the speed input unit using a power line, as shown in FIG. 5, includes a power line 850, power line communication devices 801, 811 and 821 included in respective modules 800, 810 and 820, and a power line communication device 831 included in the fuel saving apparatus 830.

In this case, the respective modules refer to an injector module 800 for controlling the injector, a GPS speedometer module 810 for measuring and sending speed, and a MAP sensor module 820 for measuring and sending injection pressure.

The respective power line communication devices 801, 811 and 821 included in the respective modules and the power line communication device 831 included in the fuel saving apparatus 830 communicate with each other by exchanging data via the power line. Since such a method of sending and receiving data via power lines is implemented based on well-known technology, a detailed description is omitted here.

Figure 7:
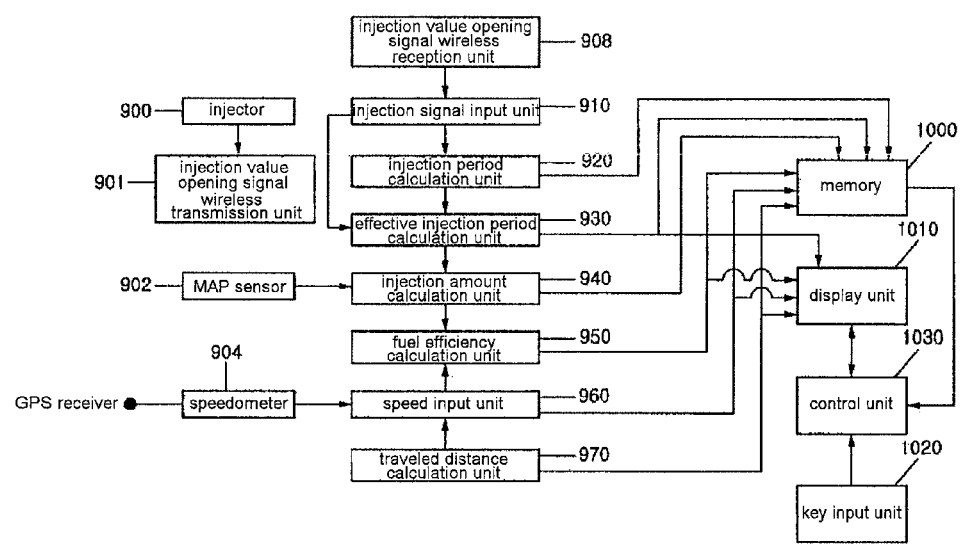
FIG. 7 is a block diagram of a fuel saving apparatus according to a fourth embodiment of the present invention.

FIG. 7 is a block diagram showing the construction of a fuel saving apparatus according to a fourth embodiment of the present invention.

As shown in this drawing, the fuel saving apparatus of the present invention includes an injector 900, an injection valve opening signal wireless transmission unit 901, a MAP sensor 902, a GPS speedometer 904, an injection valve opening signal wireless reception unit 908, an injection signal input unit 910, an injection time calculation unit 920, an effective injection time calculation unit 930, an injection amount calculation unit 940, a fuel efficiency calculation unit 950, a speed input unit 960, a traveled distance calculation unit 970, memory 1000, a display unit 1010, a key input unit 1020, and a control unit 1030.

In this case, the injection valve opening signal wireless reception unit 908, the injection signal input unit 910, the injection time calculation unit 920, and the effective injection time calculation unit 930 may be collectively referred to as an effective injection period calculation module, and the fuel efficiency calculation unit 950 and the speed input unit 960 may be collectively referred to as a fuel efficiency calculation module.

The injector 900 is an injection device that injects fuel having normal pressure, which reaches a fuel pipe, into an intake manifold in response to an electrical injection signal. Since the injector 900 is implemented based on well-known technology, a detailed description thereof is omitted here.

That is, the injector 900 receives an injection valve opening signal from an ECU, opens the injection valve, and sends the injection valve opening signal, received from the ECU, to the injection valve opening signal wireless reception unit 908 via the injection valve opening signal wireless transmission unit 901. Then, the injection valve opening signal wireless reception unit 908 sends the received injection valve opening signal to the injection signal input unit 910.

Meanwhile, the MAP sensor 902 is used to indirectly measure the amount of air drawn into the engine, and is applied to most recent vehicles. According to the operational principle of the MAP sensor 902, the MAP sensor 902 measures pressure, generated in the intake manifold, through comparison with a predetermined absolute pressure, and directly infers the amount of air on the basis of the measurement, thereby causing the injector 900 to be appropriately driven. Since the MAP sensor 902 is implemented based on well-known technology, a detailed description thereof is omitted here.

The GPS speedometer 904 includes a GPS receiver, and measures accurate time and distances from three or more satellites and calculates a current location using trigonometry based on the three different distances. Such a GPS speedometer 904 can obtain accurate time, together with 3-dimensional speed information, as well as latitude, longitude and altitude. Since a technique for detecting the speed of a vehicle using such a GPS receiver is well known, a detailed description thereof is omitted here.

The injection signal input unit 910 receives the injection valve opening signal from the injector 900 through the injection valve opening signal wireless transmission unit 901 and the injection valve opening signal wireless reception unit 908 via a wireless connection, and sends the received injection valve opening signal to the injection time calculation unit 920. The injection time calculation unit 920 calculates the injection period from the injection valve opening signal received from the injection signal input unit 910.

In this case, the waveform of the injection valve opening signal, received by the injection signal input unit 910 from the injector 900, is, for example, a stepped waveform. In this stepped waveform, a section having a voltage of 0 V is an injection section.

Accordingly, the injection time calculation unit 920 measures the period of the injection section from the injection valve opening signal, having a stepped waveform, so as to calculate an injection period, and calculates the injection period.

Meanwhile, the effective injection time calculation unit 930 obtains an effective injection period from the injection period calculated by the injection time calculation unit 920. The reason for obtaining the effective injection period is that it takes time for the injection valve to be opened to an extent that fuel can be actually drawn when the injector 900 receives the injection valve opening signal from the ECU and opens the injection valve.

Furthermore, although the injector 900 receives an injection valve opening signal from the ECU and opens the injection valve, the amount of fuel drawn for the opening period may vary with the width of the opening of the injection valve, therefore the effective injection period is required from the point of view of calculation of the average.

Accordingly, the effective injection time calculation unit 930 obtains the effective injection period in consideration of the actual operation of the injection valve. At this time, the above-described Equation 1 is used.

The effective injection time calculation unit 930 sends information about the effective injection period, calculated as described above, to the injection amount calculation unit 940, and stores it in the memory 1000.

The injection amount calculation unit 940 obtains the unit amount of injection by multiplying the effective injection period, calculated by the effective injection time calculation unit 930, by injection pressure. At this time, the above-described Equation 2 is used.

When the amount of injection is calculated as described above, the injection amount calculation unit 640 stores information about the calculated amount of injection in the memory 1000.

Thereafter, the speed input unit 960 receives information about speed from the GPS speedometer 904, sends it to the traveled distance calculation unit 970 and the fuel efficiency calculation unit 950, and stores it in the memory 1000.

The traveled distance calculation unit 970 calculates a traveled distance using the information about speed from the speed input unit 960, and stores it in the memory 1000. That is, the traveled distance calculation unit 970 calculates the traveled distance by multiplying the speed, received from the speed input unit 960, by time, and stores it in the memory 1000.

Then, the fuel efficiency calculation unit 950 calculates fuel efficiency using the amount of injection from the injection amount calculation unit 940 and the speed from the speed input unit 960 based on the above-described Equation 3.

Meanwhile, the control unit 1030 controls the injection signal input unit 910, the injection time calculation unit 920, the effective injection time calculation unit 930, the injection amount calculation unit 940, the fuel efficiency calculation unit 950, the speed input unit 960, and the traveled distance calculation unit 970.

The control unit 1030 controls the display unit 1010 so that it displays speed, displays an effective injection period using a histogram, and displays fuel efficiency. Furthermore, the control unit 1030 controls the display unit 1010 so that it displays accumulated traveling fuel efficiency, sectional traveling fuel efficiency, section distance, the amount of fuel consumed, the injection period, and the engine oil replacement distance.

An example of speed, an effective injection period histogram, an effective injection period, and effective fuel efficiency, displayed on the display unit 1010, is similar to that of FIG. 3. The speed is displayed on the lower left portion of the display unit 1010 in numerals, the fuel efficiency is displayed on the lower right portion thereof in numerals, the effective injection period is displayed on the upper right portion thereof in numerals, and the effective injection period is displayed on the upper portion thereof using a bent histogram graph. The bent histogram graph includes a green section, a blue section, and a red section. The green section includes, for example, five bars. If one bar is set such that it indicates 0.5 ms, the green section indicates cases where the effective injection period falls within the range of 0 to 2.5. The blue section includes, for example, five bars. If one bar is set such that it indicates 0.5 ms, the blue section indicates cases where the effective injection period falls within the range of 2.5 to 5. The red section includes, for example, six bars. If one bar is set such that it indicates 0.5 ms, the red section indicates cases where the effective injection period falls within the range of 5 to 8 ms. Of course, in the case where the effective injection period is equal to or longer than 8 ms, there is no increase in the number of activated bars of the histogram.

In this case, when the number of activated bars of the bent histogram graph increases, the driver is made visually aware of the extension of the effective injection period, therefore the driver does not step on an accelerator pedal, so that an indication can be located within the green section when the indication enters the red section, thereby reducing fuel consumption.

Meanwhile, the control unit 1030 provides the display unit 1010 with accumulated traveling fuel efficiency, sectional traveling fuel efficiency, section distance, the amount of fuel consumed, the injection period, the engine oil replacement distance, and GPS information.

That is, when the driver indicates a desire to know accumulated traveling fuel efficiency through the manipulation of the key input unit 1020, the control unit 1030 reads the real-time traveling fuel efficiency stored in the memory 1000, calculates the accumulated fuel efficiency, and provides information about the accumulated fuel efficiency to the driver via the display unit 1010.

Furthermore, when the driver indicates a desire to know the section-accumulated fuel efficiency for a specific section through the manipulation of the key input unit 1020, the control unit 1030 calculates section-accumulated fuel efficiency for a section designated by the user, and provides information about the section-accumulated fuel efficiency to the driver via the display unit 1010.

Furthermore, when the driver indicates a desire to know the section distance of a specific section through the manipulation of the key input unit 1020, the control unit 1030 reads traveled distance stored in the memory 1000, calculates the section distance of the specific section, and displays information about the calculated section distance on the display unit 1010.

Furthermore, when the driver indicates a desire to know the amount of fuel consumed in a specific section through the manipulation of the key input unit 1020, the control unit 1030 reads the amount of fuel consumed in the specific section stored in the memory 1000, and displays information about the amount of fuel consumed on the display unit 1010.

Furthermore, when the driver indicates a desire to know the traveled distance accumulated from the time point at which the engine oil was replaced, through the manipulation of the key input unit 1020 so as to know the time point for the replacement of engine oil, the control unit 1030 reads the traveled distance, accumulated from the time point at which engine oil was replaced to the current time point, from the memory 1000, and displays it to the driver. The driver may replace the engine oil using the information.

As described above, the control unit 1030 reads information about the accumulated traveling fuel efficiency, the sectional traveling fuel efficiency, the section distance, the amount of fuel consumed, the injection period, and the engine oil replacement distance from the memory 1000 in response to the key manipulation of the key input unit 1020 by the driver, and provides this to the driver.

That is, the central key of the key input unit 1020 is an ON/OFF key. When the driver turns on the ON/OFF key, the control unit 1030 provides available menu options to the display unit 1010.

The available menu options, which are provided by the control unit 1030 to the display unit 1010, include accumulated traveling fuel efficiency, sectional traveling fuel efficiency, section distance, the amount of fuel consumed, the injection period, the engine oil replacement distance, and GPS information.

When the menu options are provided via the display unit 1010 as described above, the driver can select a desired menu option using the up/down key of the key input unit 1020, and the control unit 1030 reads information related to the selected menu option from the memory 1000 and displays it on the display unit 1010.

In particular, when the driver requests GPS information through the key manipulation of the key input unit 1020, the control unit 1030 reads the GPS information from a GPS terminal (not shown) and provides this.

Figure 8:
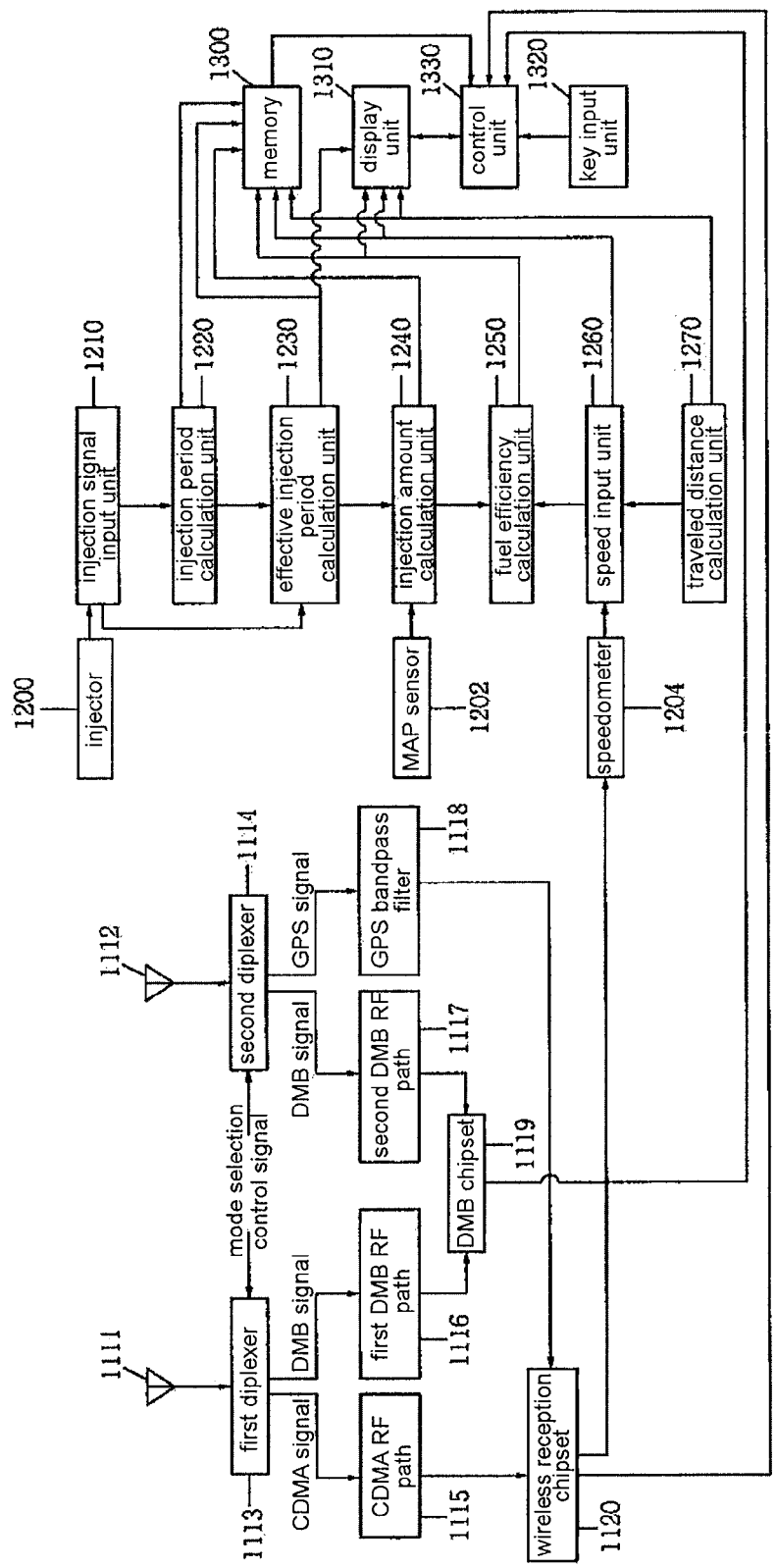
FIG. 8 is a block diagram of a fuel saving apparatus according to a fifth embodiment of the present invention.

FIG. 8 is a block diagram of a fuel saving apparatus for a vehicle according to a fifth embodiment of the present invention.

Referring to this drawing, the fuel saving apparatus for a vehicle according to the fifth embodiment of the present invention includes a CDMA-DMB dual-band antenna 1111 for receiving a CDMA signal or a DMB signal, a DMB-GPS dual-band antenna 1112 for receiving a DMB signal or a GPS signal, a first diplexer 1113 for directing the CDMA signal or DMB signal received from the CDMA-DMB dual-band antenna 1111, a second diplexer 1114 for directing the DMB signal or GPS signal received from the DMB-GPS dual-band antenna 1112, a DMB chipset 1119 for selecting a higher-quality one from among the DMB signal from the first diplexer 1123 and the DMB signal from the second diplexer 1124 and data-processing it, a wireless reception chipset 1120 for converting the CDMA signal, output from the first diplexer 1113 and signal-processed while being passed through an RF path, or the GPS signal, output from the second diplexer 1114 and signal-processed while being passed through an RF path into baseband signals, and a GPS band pass filter 1118 for passing a band of the GPS signal from the second diplexer 1114.

Furthermore, the fuel saving apparatus for a vehicle according to the fifth embodiment of the present invention further includes an injector 1200, a MAP sensor 1202, a speedometer 1204, an injection signal input unit 1210, an injection time calculation unit 1220, an effective injection time calculation unit 1230, an injection amount calculation unit 1240, a fuel efficiency calculation unit 1250, a speed input unit 1260, a traveled distance calculation unit 1270, memory 1300, a display unit 1310, a key input unit 1320, and a control unit 1330.

In FIG. 8, a CDMA RF path 1115 is a path through which the CDMA signal from the first diplexer 1113 is transmitted to the wireless reception chipset 1120, a first DMB RF path 1116 is a path through which the DMB signal from the first diplexer 1113 is transmitted to the DMB chipset 1119, and a second DMB RF path 1117 is a path through which the DMB signal from the second diplexer 1114 is transmitted to the DMB chipset 1119.

In this case, the first diplexer 1113, the CDMA RF path 1115 and the wireless reception chipset 1120 may be regarded as a mobile communication module. The first diplexer 1113, the first DMB RF path 1116, the second diplexer 1114, the second DMB RF path 1117, and the DMB chipset 1119 may be collectively regarded as a DMB module. The second diplexer 1114, the GPS band-pass filter 1118 and the wireless reception chipset 1120 may be collectively regarded as a GPS module.

The injection signal input unit 1210, the injection time calculation unit 1220 and the effective injection time calculation unit 1230 may be collectively considered an effective injection period calculation module, and the fuel efficiency calculation unit 1250 and the speed input unit 1260 may be referred to as a fuel efficiency calculation module.

The operation of the fifth embodiment of the present invention, shown in FIG. 8, will be described below.

The signal received through the CDMA-DMB dual-band antenna 1111 is determined by the first diplexer 1113 to be a CDMA signal or a DMB signal in response to a mode selection control signal. The CDMA signal output from the first diplexer 1113 is signal-processed while being passed through the CDMA RF path 1115, and is then input to the wireless reception chipset 1120.

The DMB signal output from the first diplexer 1113 is signal-processed through the first DMB RF path 1116, and is then input to the DMB chipset 1119. The signal received through the DMB-GPS dual-band antenna 1112 is determined by the second diplexer 1114 to be a DMB signal or a GPS signal in response to a mode selection control signal. The DMB signal output from the second diplexer 1114 is signal-processed while being passed through the second DMB RF path 1117, and is then input to the DMB chipset 1119. The GPS signal output from the second diplexer 1114 is band-passed through the GPS band-pass filter 1118, and is then input to the wireless reception chipset 1120. The wireless reception chipset 1120 converts the input CDMA signal and DMB signal into baseband signals, and transmits them to the control unit 1330. An RFR chipset may be used as the wireless reception chipset 1120. In this case, the RFR chipset converts the CDMA signal and the GPS signal, which are RF signals, into baseband signals by mixing them with local signals that are output from a VCO contained in a chip. The DMB chipset 1119 selects a higher-quality one from among the DMB signal input through the first DMB RF path 1116 and the DMB signal input through the second DMB RF path 1117, converts it into a baseband signal, and transmits it to the control unit 1330.

The control unit 1330 receives the CDMA signal, the DMB signal and the GPS signal, converted into the baseband signals, and data-processes them so that they can be used by application programs of a mobile communication terminal.

Meanwhile, the injector 1200 receives an injection valve opening signal from an ECU, opens an injection valve, and sends the injection valve opening signal, received from the ECU, to the injection signal input unit 1210.

The injection signal input unit 1210 receives the injection valve opening signal from the injector 1200 via a wired connection, and sends the received injection valve opening signal to the injection time calculation unit 1220.

The injection time calculation unit 1220 calculates the injection period from the injection valve opening signal received from the injection signal input unit 1210.

In this case, the waveform of the injection valve opening signal, received by the injection signal input unit 1210 from the injector 1200, is, for example, a stepped waveform. In this stepped waveform, a section having a voltage of 0 V is an injection section.

Accordingly, the injection time calculation unit 1220 measures the period of the injection section from the injection valve opening signal, having a stepped waveform, so as to calculate an injection period, and calculates the injection period.

Meanwhile, the effective injection time calculation unit 1230 obtains an effective injection period from the injection period calculated by the injection time calculation unit 1220.

The reason for obtaining the effective injection period is that it takes time for the injection valve to be opened to the extent that fuel can be actually drawn when the injector 1200 receives the injection valve opening signal from the ECU and opens the injection valve.

Furthermore, although the injector 1200 receives an injection valve opening signal from the ECU and opens the injection valve, the amount of fuel drawn for an opening period may vary with the width of the opening of the injection valve, therefore the effective injection period is required from the point of view of calculation of the average.

Accordingly, the effective injection time calculation unit 1230 obtains the effective injection period in consideration of the actual operation of the injection valve. At this time, the effective injection time calculation unit 1230 can obtain the effective injection period from the injection period, input from the injection time calculation unit 1220, using the above-described Equation 1.

That is, the effective injection time calculation unit 1230 receives the injection period, calculated by the injection time calculation unit 1220, receives the injection valve opening signal from the injection signal input unit 1210, measures the rated voltage, calculates the ineffective injection period, and then can calculate the effective injection period using the above-described Equation 1.

The effective injection time calculation unit 1230 sends information about the effective injection period, calculated as described above, to the injection amount calculation unit 1240, and stores this in the memory 1300.

The injection amount calculation unit 1240 obtains the unit amount of injection by multiplying the effective injection period, calculated by the effective injection time calculation unit 1230, by injection pressure, which is expressed by the above-described Equation 2.

When the amount of injection is calculated, as described above, the injection amount calculation unit 1240 stores information about the calculated amount of injection in the memory 1300.

Thereafter, the speed input unit 1260 receives information about speed from the speedometer 1204, sends it to the traveled distance calculation unit 1270 and the fuel efficiency calculation unit 1250, and stores it in the memory 1300.

In this case, the speedometer 1204 receives location information from the wireless reception chipset 1120, and can obtain speed by calculating the moving distance over time using the received location information.

Furthermore, the speedometer 1204 provides information about the speed, obtained as described above, to the speed input unit 1260.

The traveled distance calculation unit 1270 calculates the traveled distance using the information about speed from the speed input unit 1260, and stores it in the memory 1300. That is, the traveled distance calculation unit 1270 calculates the traveled distance by multiplying the speed, received from the speed input unit 1260, by time, and stores it in the memory 1300.

Then, the fuel efficiency calculation unit 1250 calculates fuel efficiency using the amount of injection from the injection amount calculation unit 1240 and the speed from the speed input unit 1260, based on the above-described Equation 3.

That is, the fuel efficiency calculation unit 1250 obtains the traveling fuel efficiency of the vehicle by dividing the traveling speed by the amount of injection.

Meanwhile, the control unit 1330 controls the injection signal input unit 1210, the injection time calculation unit 1220, the effective injection time calculation unit 1230, the injection amount calculation unit 1240, the fuel efficiency calculation unit 1250, the speed input unit 1260, and the traveled distance calculation unit 1270.

Furthermore, the control unit 1330 controls the display unit 1310 so that it displays DMB information and GPS information. Furthermore, the control unit 1330 controls the display unit 1310 so that it displays engine load and speed, displays an effective injection period using a histogram, and displays fuel efficiency. Furthermore, the control unit 1330 controls the display unit 1310 so that it displays accumulated traveling fuel efficiency, sectional traveling fuel efficiency, section distance, the amount of fuel consumed, the injection period, and the engine oil replacement distance.

Figure 9:
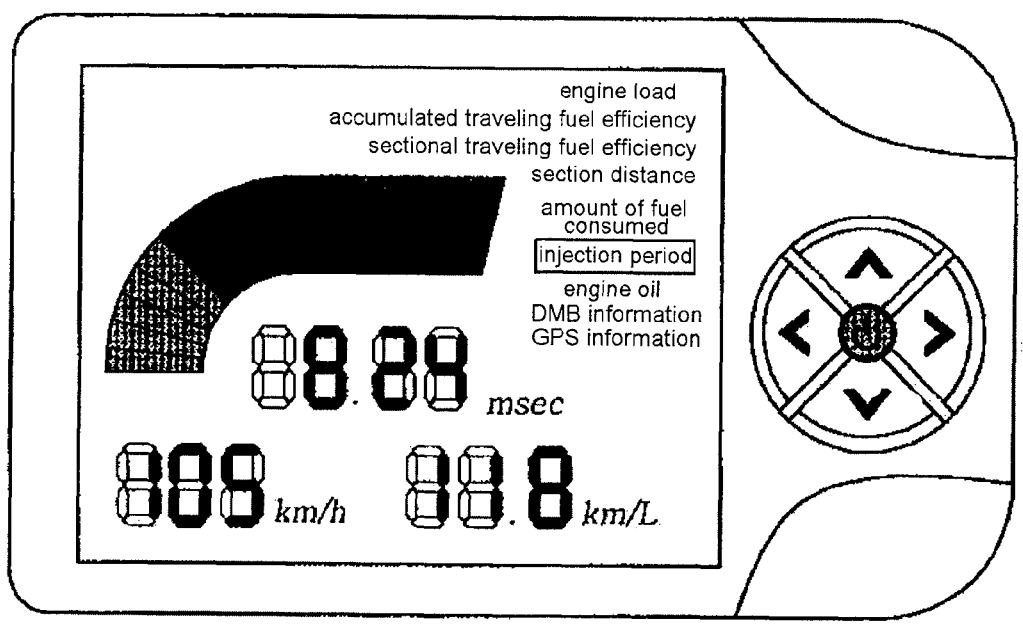
FIG. 9 is a view showing an embodiment in which indicated values are displayed on the display unit of FIG. 8.

An example of speed, an effective injection period histogram, an effective injection period, and effective fuel efficiency, displayed on the display unit 1310, is illustrated in FIG. 9. The speed is displayed on the lower left portion of the display unit 1310 in numerals, the fuel efficiency is displayed on the lower right portion thereof in numerals, the effective injection period is displayed on the upper right portion thereof in numerals, and the effective injection period is displayed on the upper portion thereof using a bent histogram graph. The bent histogram graph includes a green section, a blue section, and a red section. The green section includes, for example, five bars. If one bar is set such that it indicates 0.5 ms, the green section indicates cases where the effective injection period falls within the range of 0 to 2.5. The blue section includes, for example, five bars. If one bar is set such that it indicates 0.5 ms, the blue section indicates cases where the effective injection period falls within the range of 2.5 to 5. The red section includes, for example, six bars. If one bar is set such that it indicates 0.5 ms, the red section indicates cases where the effective injection period falls within the range of 5 to 8 ms. Of course, in the case where the effective injection period is equal to or longer than 8 ms, there is no increase in the number of activated bars of the histogram.

In this case, when the number of activated bars of the bent histogram graph increases, the driver is made visually aware of the extension of the effective injection period, therefore the driver does not step on an accelerator pedal so that an indication can be located within the blue section when the indication enters the red section, thereby reducing fuel consumption.

Meanwhile, the control unit 1330 provides the display unit 1310 with engine load, accumulated traveling fuel efficiency, sectional traveling fuel efficiency, section distance, the amount of fuel consumed, the injection period, the engine oil replacement distance, DMB information and GPS information.

This engine load has been described above. The accumulated traveling fuel efficiency refers to traveling fuel efficiency accumulated for a period from a specific time point set by a driver to the current time point, and the sectional traveling fuel efficiency refers to the sectional traveling fuel efficiency for a specific section set by the driver.

The section distance refers to the traveled distance of a specific section set by the driver for a corresponding device, and the amount of fuel consumed refers to the amount of fuel consumed at a specific time point.

The effective injection period refers to a period for which fuel is drawn, and the engine oil replacement distance refers to traveled distance for a period from a time point at which engine oil was replaced to the current time point. The DMB information refers to a multimedia broadcast, which is received via the VHF No. 12 channel in motion. The GPS information refers to geographical information.

That is, when the driver indicates a desire to know engine load through the manipulation of the key input unit 1320, the control unit 1330 reads engine load stored in the memory 1300, and provides information about the engine load to the driver using the graduations of a histogram via the display unit 1310.

Furthermore, when the driver indicates a desire to know accumulated traveling fuel efficiency through the manipulation of the key input unit 1320, the control unit 1330 reads real-time traveling fuel efficiency stored in the memory 1300, calculates accumulated fuel efficiency, and provides information about the accumulated fuel efficiency to the driver via the display unit 1310.

Furthermore, when the driver indicates a desire to know the section-accumulated fuel efficiency for a specific section through the manipulation of the key input unit 1320, the control unit 1330 calculates section-accumulated fuel efficiency for a section designated by the user, and provides information about the section-accumulated fuel efficiency to the driver via the display unit 1310.

Furthermore, when the driver indicates a desire to know the section distance of a specific section through the manipulation of the key input unit 1320, the control unit 1330 reads a traveled distance stored in the memory 1300, calculates the section distance of the specific section, and displays information about the calculated section distance on the display unit 1310.

Furthermore, when the driver indicates a desire to know the amount of fuel consumed in a specific section through the manipulation of the key input unit 1320, the control unit 1330 reads the amount of fuel consumed in a specific section stored in the memory 1300, and displays information about the amount of fuel consumed on the display unit 1310.

Furthermore, when the driver indicates a desire to know the traveled distance, accumulated from a time point at which engine oil was replaced, through the manipulation of the key input unit 1320 so as to know the time point for replacement of engine oil, the control unit 1330 reads the traveled distance, accumulated from the time point at which engine oil was replaced to the current time point, from the memory 1300, and displays it to the driver. The driver may replace engine oil using the information.

As described above, the control unit 1330 reads information about the engine load, the accumulated traveling fuel efficiency, the sectional traveling fuel efficiency, the section distance, the amount of fuel consumed, the injection period, and the engine oil replacement distance from the memory 1300 in response to the key manipulation of the key input unit 1320 by the driver, and provides it to the driver.

That is, the central key of the key input unit 1320 is an ON/OFF key. When the driver turns on the ON/OFF key, the control unit 1330 provides available menu options to the display unit 1310.

The available menu options, which are provided by the control unit 1330 to the display unit 1310, include engine load, accumulated traveling fuel efficiency, sectional traveling fuel efficiency, section distance, the amount of fuel consumed, an injection period, engine oil replacement distance, DMB information, and GPS information.

When the menu options are provided via the display unit 1310 as described above, the driver can select a desired menu option using the up/down key of the key input unit 1320, and the control unit 1330 reads information related to the selected menu option from the memory 1300 and displays it on the display unit 1310.

In particular, when the driver requests DMB information through the key manipulation of the key input unit 1320, the control unit 1330 receives DMB information from the DMB module and provides it.

Furthermore, when the driver requests GPS information through the key manipulation of the key input unit 1320, the control unit 1330 reads GPS information from the GPS module and provides it.

Meanwhile, although data is described as being sent between the injector 1200 and the injection signal input unit 1210, between the MAP sensor 1202, the engine load calculation unit 1235 and the injection amount calculation unit 1250, and between the speedometer 1204 and the speed input unit 1260 via a wired connection, the connection method is not limited to this, and data may alternatively be sent via a power line.

Figure 10:
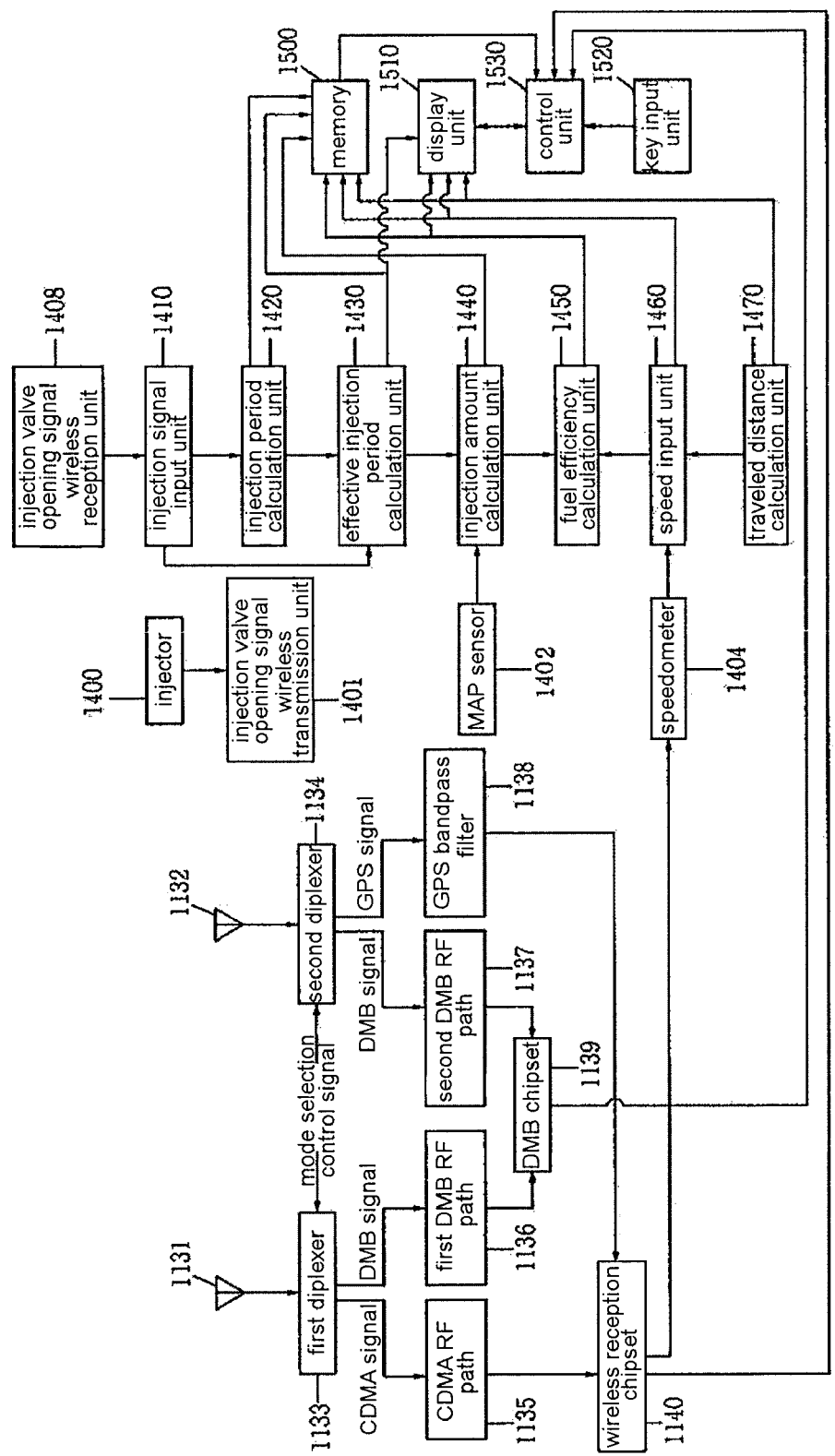
FIG. 10 is a block diagram of a fuel saving apparatus according to a sixth embodiment of the present invention.

FIG. 10 is a block diagram showing the construction of a fuel saving apparatus for a vehicle according to a sixth embodiment of the present invention.

As shown in this drawing, referring to this drawing, the fuel saving apparatus for a vehicle according to the sixth embodiment of the present invention includes a CDMA-DMB dual-band antenna 1131 for receiving a CDMA signal or a DMB signal, a DMB-GPS dual-band antenna 1132 for receiving a DMB signal or a GPS signal, a first diplexer 1133 for directing the CDMA signal or DMB signal received from the CDMA-DMB dual-band antenna 1131, a second diplexer 1134 for directing the DMB signal or GPS signal received from the DMB-GPS dual-band antenna 1132, a DMB chipset 1139 for selecting a higher-quality one from among the DMB signal from the first diplexer 1133 and the DMB signal from the second diplexer 1134 and data-processing it, a wireless reception chipset 1140 for converting the CDMA signal, output from the first diplexer 1133 and signal-processed while being passed through an RF path, or the GPS signal, output from the second diplexer 1134 and signal-processed while being passed through an RF path, into baseband signals, and a GPS band pass filter 1138 for passing a band of the GPS signal from the second diplexer 1134.

Furthermore, the fuel saving apparatus for a vehicle according to the sixth embodiment of the present invention further includes an injector 1400, an injection valve opening signal wireless transmission unit 1401, a MAP sensor 1402, a speedometer 1404, an injection valve opening signal wireless reception unit 1408, an injection signal input unit 1410, an injection time calculation unit 1420, an effective injection time calculation unit 1430, an injection amount calculation unit 1440, a fuel efficiency calculation unit 1450, a speed input unit 1460, a traveled distance calculation unit 1470, memory 1500, a display unit 1510, a key input unit 1520, and a control unit 1530.

Now, with reference to FIG. 10, the operation of the sixth embodiment of the present invention is described in detail below.

The signal received through the CDMA-DMB dual-band antenna 1131 is distinguished by the first diplexer 1133 as a CDMA signal or a DMB signal in response to a mode selection control signal. The CDMA signal output from the first diplexer 1133 is signal-processed while being passed through the CDMA RF path 1135, and is then input to the wireless reception chipset 1140.

The DMB signal output from the first diplexer 1133 is signal-processed through the first DMB RF path 1136, and is then input to the DMB chipset 1139. The signal received through the DMB-GPS dual-band antenna 1132 is distinguished by the second diplexer 1134 as a DMB signal or a GPS signal in response to a mode selection control signal. The DMB signal output from the second diplexer 1134 is signal-processed while being passed through the second DMB RF path 1137, and is then input to the DMB chipset 1139. The GPS signal output from the second diplexer 1134 is band-passed through the GPS band-pass filter 1138, and is then input to the wireless reception chipset 1140. The wireless reception chipset 1140 converts the input CDMA signal and DMB signal into baseband signals, and transmits them to the control unit 1530. An RFR chipset may be used as the wireless reception chipset 1140. In this case, the RFR chipset converts the CDMA signal and the GPS signal, which are RF signals, into baseband signals by mixing them with local signals output from a VCO contained in a chip. The DMB chipset 1139 selects a higher-quality one from among the DMB signal input through the first DMB RF path 1136 and the DMB signal input through the second DMB RF path 1137, converts it into a baseband signal, and transmits it to the control unit 1530.

The control unit 1530 receives the CDMA signal, the DMB signal and the GPS signal, converted into the baseband signals, and data-processes them so that they can be used by application programs of a mobile communication terminal.

Meanwhile, the injector 1400 is an injection device that injects fuel having normal pressure, which reaches a fuel pipe, into an intake manifold in response to an electrical injection signal. Since the injector 1400 is implemented based on well-known technology, a detailed description thereof is omitted here.

That is, the injector 1400 receives an injection valve opening signal from an ECU, opens the injection valve, and sends the injection valve opening signal, received from the ECU, to the injection valve opening signal wireless reception unit 1408 via the injection valve opening signal wireless transmission unit 1401. Then, the injection valve opening signal wireless reception unit 1408 sends the received injection valve opening signal to the injection signal input unit 1410.

Meanwhile, the MAP sensor 1402 is used to indirectly measure the amount of air drawn into an engine, and is applied to most recent vehicles. According to the operational principle of the MAP sensor 1402, the MAP sensor 1402 measures pressure, generated in the intake manifold, through comparison with a predetermined absolute pressure, and directly infers the amount of air on the basis of the measurement, thereby causing the injector 1400 to be appropriately driven. Since the MAP sensor 1402 is implemented based on well-known technology, a detailed description thereof is omitted here.

In this case, the speedometer 1404 receives location information from the wireless reception chipset 1140, and can obtain a speed by calculating moving distance over time using the received location information.

Furthermore, the speedometer 1404 provides information about the speed, obtained as described above, to the speed input unit 1460.

The injection signal input unit 1410 receives the injection valve opening signal from the injector 1400 through the injection valve opening signal wireless transmission unit 1401 and the injection valve opening signal wireless reception unit 1408 via a wireless connection, and sends the received injection valve opening signal to the injection time calculation unit 1420. The injection time calculation unit 1420 calculates an injection period from the injection valve opening signal received from the injection signal input unit 1410.

In this case, the waveform of the injection valve opening signal, received by the injection signal input unit 1410 from the injector 1400, is, for example, a stepped waveform. In this stepped waveform, a section having a voltage of 0 V is an injection section.

Accordingly, the injection time calculation unit 1420 measures the period of the injection section from the injection valve opening signal, having a stepped waveform, so as to calculate an injection period, and calculates the injection period.

Meanwhile, the effective injection time calculation unit 1430 obtains an effective injection period from the injection period calculated by the injection time calculation unit 1420. The reason for obtaining the effective injection period is that it takes time for the injection valve to be opened to the extent that fuel can be actually drawn when the injector 1400 receives the injection valve opening signal from the ECU and opens the injection valve.

Furthermore, although the injector 1400 receives an injection valve opening signal from the ECU and opens the injection valve, the amount of fuel drawn for the opening period may vary with the width of the opening of the injection valve, therefore the effective injection period is required from the point of view of calculation of the average.

Accordingly, the effective injection time calculation unit 1430 obtains the effective injection period in consideration of the actual operation of the injection valve. At this time, the above-described Equation 1 is used.

The effective injection time calculation unit 1430 sends information about the effective injection period, calculated as described above, to the injection amount calculation unit 1440, and stores it in the memory 1500.

The injection amount calculation unit 1440 obtains the unit amount of injection by multiplying the effective injection period, calculated by the effective injection time calculation unit 1430, by injection pressure. At this time, the above-described Equation 2 is used.

When the amount of injection is calculated as described above, the injection amount calculation unit 1440 stores information about the calculated amount of injection in the memory 1500.

Thereafter, the speed input unit 1460 receives information about speed from the GPS speedometer 1404, sends it to the traveled distance calculation unit 1470 and the fuel efficiency calculation unit 1450, and stores it in the memory 1500.

The traveled distance calculation unit 1470 calculates traveled distance using the information about speed from the speed input unit 1460, and stores it in the memory 1500. That is, the traveled distance calculation unit 1470 calculates the traveled distance by multiplying the speed, received from the speed input unit 1460, by time, and stores it in the memory 1500.

Then, the fuel efficiency calculation unit 1450 calculates fuel efficiency using the amount of injection from the injection amount calculation unit 1440 and the speed from the speed input unit 1460 based on the above-described Equation 3.

Meanwhile, the control unit 1530 controls the injection signal input unit 1410, the injection time calculation unit 1420, the effective injection time calculation unit 1430, the injection amount calculation unit 1440, the fuel efficiency calculation unit 1450, the speed input unit 1460, and the traveled distance calculation unit 1470.

The control unit 1530 controls the display unit 1510 so that it displays DMB information and GPS information. The control unit 1530 controls the display unit 1510 so that it displays speed, displays an effective injection period using a histogram, and displays fuel efficiency. Furthermore, the control unit 1530 controls the display unit 1510 so that it displays accumulated traveling fuel efficiency, sectional traveling fuel efficiency, section distance, the amount of fuel consumed, the injection period, and the engine oil replacement distance.

An example of speed, an effective injection period histogram, an effective injection period, and effective fuel efficiency, displayed on the display unit 1510, is similar to that of FIG. 9. The speed is displayed on the lower left portion of the display unit 1510 in numerals, the fuel efficiency is displayed on the lower right portion thereof in numerals, the effective injection period is displayed on the upper right portion thereof in numerals, and the effective injection period is displayed on the upper portion thereof using a bent histogram graph.

Meanwhile, the control unit 1530 provides the display unit 1510 with accumulated traveling fuel efficiency, sectional traveling fuel efficiency, section distance, the amount of fuel consumed, the injection period, the engine oil replacement distance, DMB information, and GPS information.

That is, when the driver indicates a desire to know accumulated traveling fuel efficiency through the manipulation of the key input unit 1520, the control unit 1530 reads real-time traveling fuel efficiency stored in the memory 1500, calculates accumulated fuel efficiency, and provides information about the accumulated fuel efficiency to the driver via the display unit 1510.

Furthermore, when the driver indicates a desire to know the section-accumulated fuel efficiency for a specific section through the manipulation of the key input unit 1520, the control unit 1530 calculates section-accumulated fuel efficiency for a section designated by the user, and provides information about the section-accumulated fuel efficiency to the driver via the display unit 1510.

Furthermore, when the driver indicates a desire to know the section distance of a specific section through the manipulation of the key input unit 1520, the control unit 1530 reads traveled distance stored in the memory 1500, calculates the section distance of the specific section, and displays information about the calculated section distance on the display unit 1510.

Furthermore, when the driver indicates a desire to know the amount of fuel consumed in a specific section through the manipulation of the key input unit 1520, the control unit 1530 reads the amount of fuel consumed in the specific section stored in the memory 1500, and displays information about the amount of fuel consumed on the display unit 1510.

Furthermore, when the driver indicates a desire to know traveled distance, accumulated from a time point at which engine oil was replaced, through the manipulation of the key input unit 1520 so as to know a time point for replacement of engine oil, the control unit 1530 reads the traveled distance, accumulated from a time point at which engine oil was replaced to the current time point, from the memory 1500, and displays it to the driver. The driver may replace engine oil using the information.

As described above, the control unit 1530 reads information about the accumulated traveling fuel efficiency, the sectional traveling fuel efficiency, the section distance, the amount of fuel consumed, the injection period, and the engine oil replacement distance from the memory 1500 in response to the key manipulation of the key input unit 1520 by the driver, and provides it to the driver.

That is, the central key of the key input unit 1520 is an ON/OFF key. When the driver turns on the ON/OFF key, the control unit 1530 provides available menu options to the display unit 1510.

The available menu options, which are provided by the control unit 1530 to the display unit 1510, include accumulated traveling fuel efficiency, sectional traveling fuel efficiency, section distance, the amount of fuel consumed, the injection period, the engine oil replacement distance, and GPS information.

When the menu options are provided via the display unit 1510 as described above, the driver can select a desired menu option using the up/down key of the key input unit 1520, and the control unit 1530 reads information related to the selected menu option from the memory 1500 and displays it on the display unit 1510.

In particular, when the driver requests DMB information through the key manipulation of the key input unit 1520, the control unit 1530 reads the DMB information from the DMB module and provides it.

Furthermore, when the driver requests GPS information through the key manipulation of the key input unit 1520, the control unit 1530 reads the GPS information from the GPS module and provides it.

Meanwhile, although only the DMB function and the GPS function have been described here, an MP3 module may be provided to thus play MP3 files. Since the construction of such an MP3 module is well known, a detailed description thereof is omitted here.

Furthermore, a PC module for a vehicle may be provided, so that a PC function can be provided within the vehicle, and a DVD/CD function, navigation, terrestrial DMB and HSDPA, and a portable Internet function, such as Wibro, can be supported, for example, using Windows XP as an operating system. Since such a PC module for a vehicle has been well disclosed already, a description of the construction thereof is omitted here.

The invention claimed is:

1. A fuel saving apparatus, comprising:
an effective injection period calculation module for receiving an injection valve opening signal, and calculating an effective injection period;
an injection amount calculation unit for calculating an amount of injection using the effective injection period received from the effective injection period calculation module;
a fuel efficiency calculation module for receiving the amount of injection from the injection amount calculation unit and vehicle speed from a speedometer, and calculating fuel efficiency;
a display unit for displaying the effective injection period, calculated by the effective injection period calculation module, and the fuel efficiency, calculated by the fuel efficiency calculation module, to a driver; and
a control unit for controlling the effective injection period calculation module, the injection amount calculation unit, the fuel efficiency calculation module, and the display unit.

2. The fuel saving apparatus as set forth in claim 1, wherein the effective injection period calculation module receives the injection valve opening signal from an injector.

3. The fuel saving apparatus as set forth in claim 1, wherein the effective injection period calculation module receives the injection valve opening signal from an Electronic Control Unit (ECU).

4. The fuel saving apparatus as set forth in claim 1, further comprising an injector provided with a power line communication device and configured to send the injection valve opening signal through the power line communication device via a power line;
wherein the effective injection time calculation unit receives the injection valve opening signal sent by the injector via the power line.

5. The fuel saving apparatus as set forth in claim 1, wherein the injection amount calculation unit receives injection pressure from a MAP sensor, corrects the amount of injection using the received injection pressure, and calculates a corrected amount of injection.

6. The fuel saving apparatus as set forth in claim 1, further comprising an engine load calculation unit for receiving injection pressure from a MAP sensor, and calculating engine load using the received injection pressure;
 wherein the display unit displays the engine load, calculated by the engine load calculation unit, to the driver.

7. The fuel saving apparatus as set forth in claim 1, wherein the effective injection period calculation module comprises:
 an injection signal input unit for receiving the injection valve opening signal;
 an injection time calculation unit for receiving the injection valve opening signal from the injection signal input unit and calculating an injection period; and
 an effective injection time calculation unit for calculating an ineffective injection period from the injection period calculated by the injection time calculation unit, and calculating an effective injection period.

8. The fuel saving apparatus as set forth in claim 1, wherein the fuel efficiency calculation module comprises:
 a speed input unit for receiving speed; and
 a fuel efficiency calculation unit for receiving the speed from the speed input unit and the amount of injection from the injection amount calculation unit, and calculating the fuel efficiency.

9. The fuel saving apparatus as set forth in claim 8, wherein:
 the fuel efficiency calculation module further comprises a traveled distance calculation unit for receiving the speed from the speed input unit and calculating traveled distance, and
 the control unit displays the traveled distance or the section traveled distance on the display unit.

10. The fuel saving apparatus as set forth in claim 1, further comprising a wireless reception unit for receiving the injection valve opening signal and the speed from the speedometer via wireless connections, and sending them to the effective injection period calculation module and the fuel efficiency calculation module.

11. The fuel saving apparatus as set forth in claim 10, wherein the effective injection period calculation module receives the injection valve opening signal through the wireless reception unit via a wireless connection, the injection valve opening signal having been sent by an injector, including an opening signal wireless transmission unit, through the opening signal wireless transmission unit.

12. The fuel saving apparatus as set forth in claim 10, wherein the effective injection period calculation module receives the injection valve opening signal through the wireless reception unit via a wireless connection, the injection valve opening signal having been sent by an ECU, including an opening signal wireless transmission unit, through the opening signal wireless transmission unit.

13. A fuel saving apparatus, comprising:
 an effective injection period calculation module for receiving an injection valve opening signal, and calculating an effective injection period;
 an injection amount calculation unit for calculating an amount of injection using the effective injection period received from the effective injection period calculation module;
 a fuel efficiency calculation module for receiving the amount of injection from the injection amount calculation unit, receiving vehicle speed from a GPS speedometer provided with a GPS receiver for receiving a signal from a satellite, and calculating fuel efficiency;
 a display unit for displaying the effective injection period, calculated by the effective injection period calculation module, and the fuel efficiency, calculated by the fuel efficiency calculation module, to a driver; and
 a control unit for controlling the effective injection period calculation module, the injection amount calculation unit, the fuel efficiency calculation module, and the display unit.

14. The fuel saving apparatus as set forth in claim 13, wherein the effective injection period calculation module receives the injection valve opening signal from an injector.

15. The fuel saving apparatus as set forth in claim 13, wherein the effective injection period calculation module receives the injection valve opening signal from an ECU.

16. The fuel saving apparatus as set forth in claim 13, further comprising an injector provided with a power line communication device and configured to send the injection valve opening signal through the power line communication device via a power line;
 wherein the effective injection time calculation unit receives the injection valve opening signal sent by the injector via the power line.

17. The fuel saving apparatus as set forth in claim 13, wherein the injection amount calculation unit receives injection pressure from a MAP sensor, corrects the amount of injection using the received injection pressure, and calculates a corrected amount of injection.

18. The fuel saving apparatus as set forth in claim 13, further comprising an engine load calculation unit for receiving injection pressure from a MAP sensor, and calculating engine load using the received injection pressure;
 wherein the display unit displays the engine load, calculated by the engine load calculation unit, to the driver.

19. The fuel saving apparatus as set forth in claim 13, wherein the effective injection period calculation module comprises:
 an injection signal input unit for receiving the injection valve opening signal;
 an injection time calculation unit for receiving the injection valve opening signal from the injection signal input unit and calculating an injection period; and
 an effective injection time calculation unit for calculating an ineffective injection period from the injection period calculated by the injection time calculation unit, and calculating an effective injection period.

20. The fuel saving apparatus as set forth in claim 13, wherein the fuel efficiency calculation module comprises:
 a speed input unit for receiving speed; and
 a fuel efficiency calculation unit for receiving the speed from the speed input unit and the amount of injection from the injection amount calculation unit, and calculating the fuel efficiency.

21. The fuel saving apparatus as set forth in claim 20, wherein:
 the fuel efficiency calculation module further comprises a traveled distance calculation unit for receiving the speed from the speed input unit and calculating a traveled distance; and
 the control unit displays the traveled distance or the section traveled distance on the display unit.

22. The fuel saving apparatus as set forth in claim 13, further comprising a wireless reception unit for receiving the injection valve opening signal in a wireless connection, and sending it to the effective injection period calculation module and the fuel efficiency calculation module.

23. The fuel saving apparatus as set forth in claim 22, wherein the effective injection period calculation module receives through the wireless reception unit via a wireless connection, the injection valve opening signal having been sent by an injector, including an opening signal wireless transmission unit, through the opening signal wireless transmission unit.

24. The fuel saving apparatus as set forth in claim 22, wherein the effective injection period calculation module receives the injection valve opening signal through the wireless reception unit via a wireless connection, the injection valve opening signal having been sent by an ECU, including an opening signal wireless transmission unit, through the opening signal wireless transmission unit.

25. A fuel saving apparatus, comprising:
   a GPS module for receiving a GPS signal, acquiring GPS information from the received GPS signal, and outputting the GPS information;
   an effective injection period calculation module for receiving an injection valve opening signal, and calculating an effective injection period;
   an injection amount calculation unit for calculating an amount of injection using the effective injection period received from the effective injection period calculation module;
   a speedometer for calculating vehicle speed using the GPS information received from the GPS module;
   a fuel efficiency calculation module for receiving the amount of injection from the injection amount calculation unit and the vehicle speed from the speedometer, and calculating fuel efficiency;
   a display unit for displaying the effective injection period, calculated by the effective injection period calculation module, and the GPS information, output from the GPS module, to a driver; and
   a control unit for controlling the GPS module, the effective injection period calculation module, the injection amount calculation unit, the fuel efficiency calculation module, the speedometer and the display unit.

26. The fuel saving apparatus as set forth in claim 25, wherein the effective injection period calculation module receives the injection valve opening signal from an injector.

27. The fuel saving apparatus as set forth in claim 25, wherein the effective injection period calculation module receives the injection valve opening signal from an ECU.

28. The fuel saving apparatus as set forth in claim 25, further comprising an injector provided with a power line communication device and configured to send the injection valve opening signal through the power line communication device via a power line;
   wherein the effective injection time calculation unit receives the injection valve opening signal sent by the injector via the power line.

29. The fuel saving apparatus as set forth in claim 25, wherein the injection amount calculation unit receives injection pressure from a MAP sensor, corrects the amount of injection using the received injection pressure, and calculates a corrected amount of injection.

30. The fuel saving apparatus as set forth in claim 25, further comprising a DMB module for receiving a DMB signal, extracting DMB information from the received DMB signal, and outputting the DMB information; wherein the display unit provides the DMB information provided by the DMB module.

31. The fuel saving apparatus as set forth in claim 25, further comprising a mobile communication module for receiving a mobile communication signal, extracting communication information from the received mobile communication signal, and providing communication.

32. The fuel saving apparatus as set forth in claim 25, wherein the effective injection period calculation module comprises:
   an injection signal input unit for receiving the injection valve opening signal;
   an injection time calculation unit for receiving the injection valve opening signal from the injection signal input unit and calculating an injection period; and
   an effective injection time calculation unit for calculating an ineffective injection period from the injection period calculated by the injection time calculation unit, and calculating an effective injection period.

33. The fuel saving apparatus as set forth in claim 25, further comprising an MP3 module for playing an MP3 file.

34. The fuel saving apparatus as set forth in claim 25, further comprising a vehicle PC module provided with a function of accessing a portable Internet to provide a portable Internet service, and provided with a DVD/CD function to play a DVD/CD.

35. The fuel saving apparatus as set forth in claim 25, wherein the fuel efficiency calculation module comprises:
   a speed input unit for receiving speed; and
   a fuel efficiency calculation unit for receiving the speed from the speed input unit and the amount of injection from the injection amount calculation unit, and calculating the fuel efficiency.

36. The fuel saving apparatus as set forth in claim 35, wherein:
   the fuel efficiency calculation module further comprises a traveled distance calculation unit for receiving the speed from the speed input unit and calculating a traveled distance, and
   the control unit displays the traveled distance or the section traveled distance on the display unit.

37. The fuel saving apparatus as set forth in claim 25, further comprising a wireless reception unit for receiving the injection valve opening signal via a wireless connection, and sending it to the effective injection period calculation module and the fuel efficiency calculation module.

38. The fuel saving apparatus as set forth in claim 37, wherein the effective injection period calculation module receives the injection valve opening signal through the wireless reception unit via a wireless connection, the injection valve opening signal having been sent by an injector, including an opening signal wireless transmission unit, through the opening signal wireless transmission unit.

39. The fuel saving apparatus as set forth in claim 37, wherein the effective injection period calculation module receives the injection valve opening signal through the wireless reception unit via a wireless connection, the injection valve opening signal having been sent by an ECU, including an opening signal wireless transmission unit, through the opening signal wireless transmission unit.

\* \* \* \* \*